United States Patent
Igeta et al.

(10) Patent No.: US 12,422,714 B2
(45) Date of Patent: Sep. 23, 2025

(54) DISPLAY DEVICE AND MANUFACTURING METHOD THEREOF

(71) Applicant: Japan Display Inc., Tokyo (JP)

(72) Inventors: Koichi Igeta, Tokyo (JP); Kentaro Okuyama, Tokyo (JP); Koji Kitamura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/350,176

(22) Filed: Jul. 11, 2023

(65) Prior Publication Data

US 2024/0019738 A1    Jan. 18, 2024

(30) Foreign Application Priority Data

Jul. 12, 2022  (JP) .................. 2022-111935

(51) Int. Cl.
G02F 1/1337 (2006.01)
C09K 19/54 (2006.01)

(52) U.S. Cl.
CPC ...... *G02F 1/133711* (2013.01); *C09K 19/542* (2013.01); *G02F 1/133715* (2021.01); *G02F 1/133788* (2013.01); *C09K 2019/546* (2013.01); *C09K 2323/025* (2020.08)

(58) Field of Classification Search
None
See application file for complete search history.

(56) References Cited

U.S. PATENT DOCUMENTS

| | | | |
|---|---|---|---|
| 2011/0080547 A1* | 4/2011 | Matsumori | G02F 1/133723 349/124 |
| 2012/0088040 A1* | 4/2012 | Matsumori | C08G 73/1085 428/1.26 |
| 2014/0248445 A1* | 9/2014 | Tomioka | C09D 179/08 428/1.2 |
| 2018/0187080 A1* | 7/2018 | Song | C08F 220/282 |
| 2021/0311364 A1 | 10/2021 | Ikeda et al. | |

FOREIGN PATENT DOCUMENTS

| | | | | |
|---|---|---|---|---|
| JP | 2002244138 A | * | 8/2002 | |
| JP | 2003005223 A | * | 1/2003 | |
| JP | 2004086116 A | * | 3/2004 | |
| JP | 2013235130 A | * | 11/2013 | ......... C08G 73/1025 |
| JP | 2013241571 A | * | 12/2013 | |
| JP | 2015222387 A | * | 12/2015 | |
| JP | 2020177168 A | * | 10/2020 | |
| JP | 2021162767 A | | 10/2021 | |
| WO | WO-2020116540 A1 | * | 6/2020 | ....... G02F 1/133368 |

* cited by examiner

*Primary Examiner* — Martin J Angebranndt
(74) *Attorney, Agent, or Firm* — Maier & Maier, PLLC

(57) ABSTRACT

According to one embodiment, a display device includes first and second substrates and a liquid crystal layer. The first substrate includes pixel electrodes and a first alignment film. The second substrate includes a common electrode and a second alignment film. The liquid crystal layer is provided between the alignment films and contains a streaky polymer and liquid crystal molecules. The first alignment film includes flat areas. A first director of the liquid crystal molecules located near the flat areas is substantially parallel to a horizontal plane in a state where no potential difference is formed between the pixel electrodes and the common electrode.

4 Claims, 11 Drawing Sheets

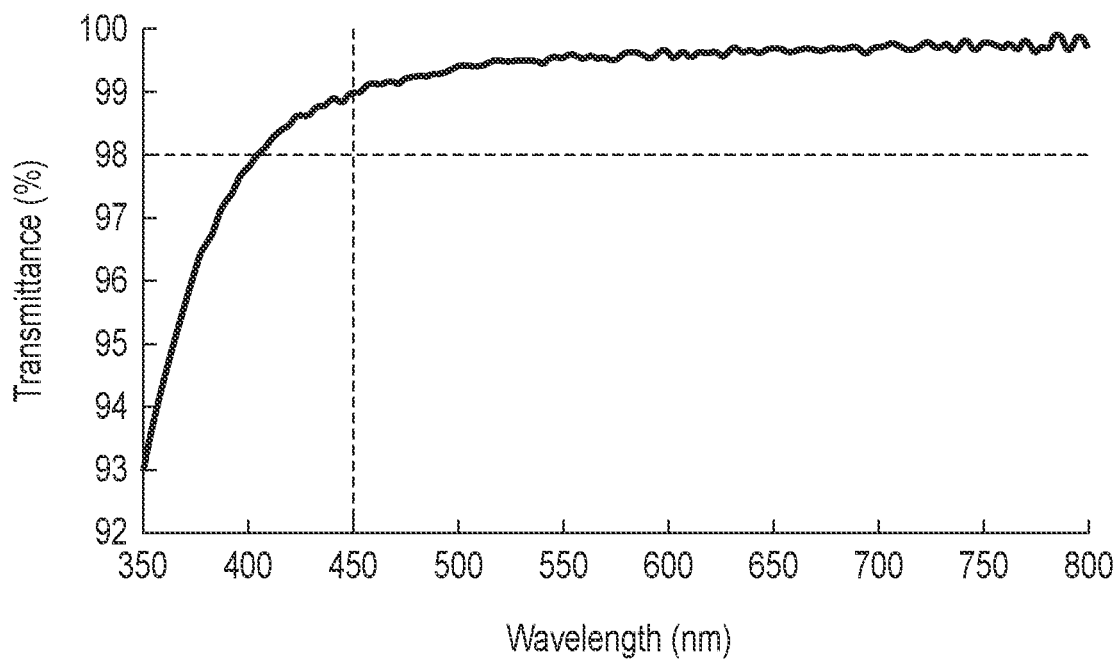
F I G. 11
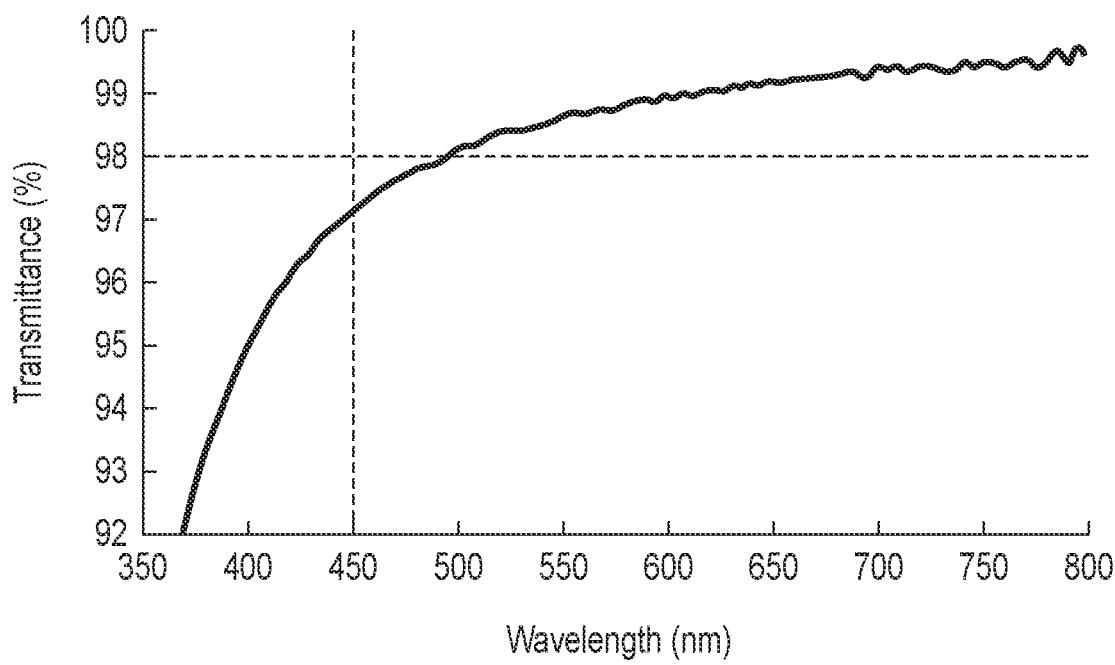
F I G. 12

DISPLAY DEVICE AND MANUFACTURING METHOD THEREOF

CROSS-REFERENCE TO RELATED APPLICATIONS

This application is based upon and claims the benefit of priority from Japanese Patent Application No. 2022-111935, filed Jul. 12, 2022, the entire contents of which are incorporated herein by reference.

FIELD

Embodiments described herein relate generally to a display device and a manufacturing method thereof.

BACKGROUND

Recently, the following display devices have been suggested. The display devices use polymer dispersed liquid crystals (PDLCs) which can switch between a scattered state for scattering incident light and a transparent state for transmitting incident light, and have a high translucency. For example, this type of display device comprises a pair of substrates each including an alignment film, and a liquid crystal layer provided between the substrates. Further, the liquid crystal layer contains streaky polymers and liquid crystal molecules.

BRIEF DESCRIPTION OF THE DRAWINGS

FIG. 11 is a graph showing an example of the transmittance spectrum of an alignment film.

FIG. 12 is a graph showing the transmittance spectrum of an alignment film formed of an alignment film material different from the example of FIG. 11.

DETAILED DESCRIPTION

Figure 1:
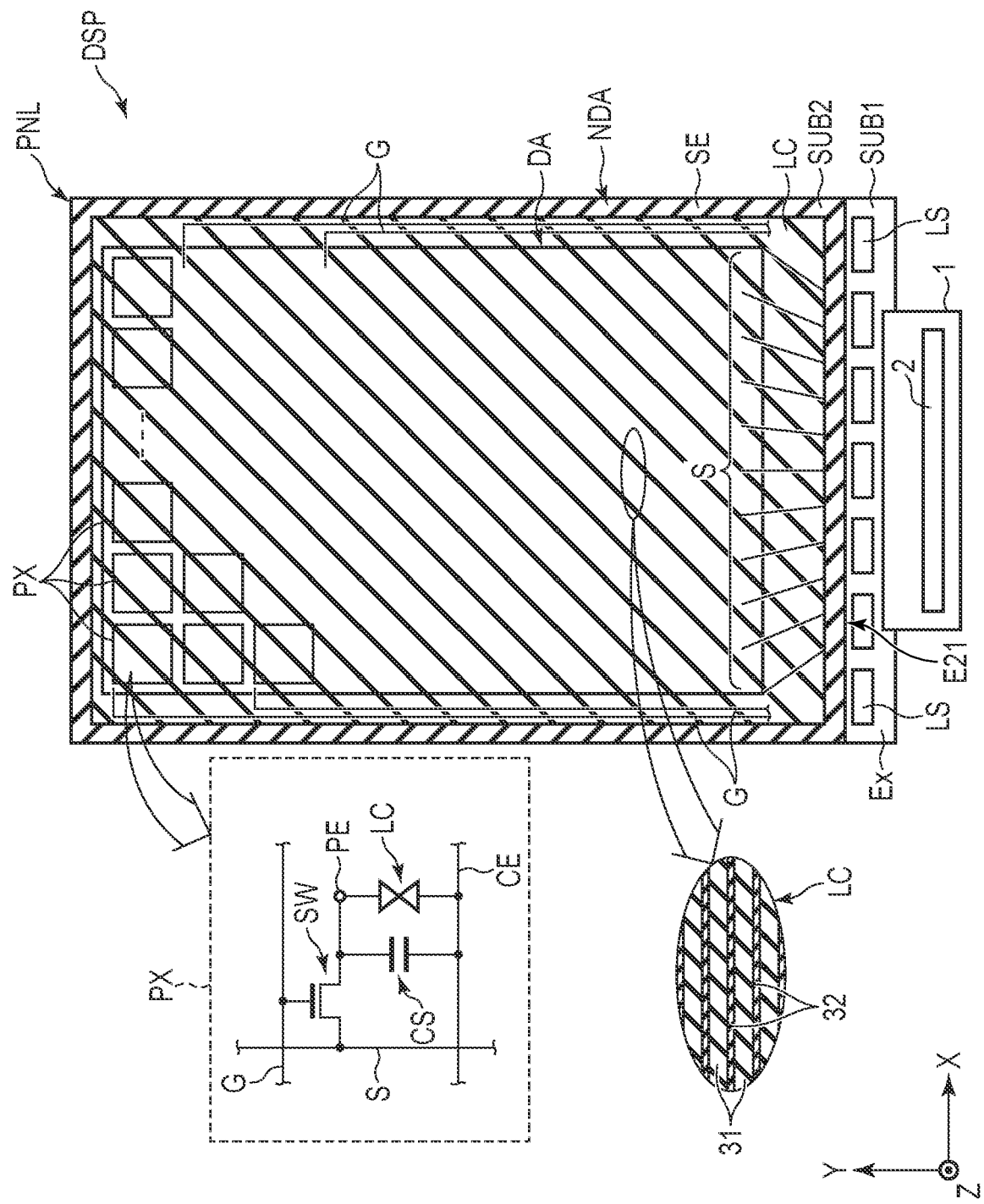
FIG. 1 is a diagram showing a configuration example of a display device according to a first embodiment.

In general, according to one embodiment, a display device comprises a first substrate, a second substrate and a liquid crystal layer. The first substrate includes a plurality of pixel electrodes provided in a plurality of pixels constituting a display area, respectively, and a first alignment film. The second substrate includes a common electrode and a second alignment film facing the first alignment film. The liquid crystal layer is provided between the first alignment film and the second alignment film and contains a streaky polymer and a plurality of liquid crystal molecules. The first alignment film comprises a plurality of flat areas formed in the pixels, respectively, and parallel to a horizontal plane of the first substrate. A first director of each of the liquid crystal molecules located near the flat areas is substantially parallel to the horizontal plane in a state where no potential difference is formed between the pixel electrodes and the common electrode.

According to another aspect of the embodiment, a manufacturing method of the display device comprises preparing the first substrate including the pixel electrodes, preparing the second substrate including the common electrode, applying a first alignment film material to a surface of the first substrate, applying a second alignment film material to a surface of the second substrate, forming the first alignment film by applying a photo-alignment treatment to the first alignment film material, forming the second alignment film by applying a photo-alignment treatment or a rubbing alignment treatment to the second alignment film material, introducing a liquid crystal material containing a liquid crystal molecule and a polymerizable monomer between the first alignment film and the second alignment film, and forming the liquid crystal layer containing the polymer and the liquid crystal molecules by polymerizing the polymerizable monomer by emitting ultraviolet light to the liquid crystal material.

The embodiment can improve the display quality of a display device using polymer dispersed liquid crystals.

Embodiments will be described with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the drawings, in order to facilitate understanding, an X-axis, a Y-axis and a Z-axis orthogonal to each other are shown depending on the need. A direction parallel to the X-axis is referred to as a first direction. A direction parallel to the Y-axis is referred to as a second direction. A direction parallel to the Z-axis is referred to as a third direction. When various elements are viewed parallel to the third direction Z, the appearance is defined as a plan view.

First Embodiment

FIG. 1 is a diagram showing a configuration example of a display device DSP according to a first embodiment. The display device DSP is a liquid crystal display device (in other words, a transparent display) to which polymer dispersed liquid crystals are applied and which has a high translucency. The display device DSP comprises a display panel PNL, a wiring board 1, an IC chip 2 and a plurality of light sources LS.

The display panel PNL comprises a first substrate (array substrate) SUB1, a second substrate (counter substrate) SUB2, a liquid crystal layer LC and a sealant SE. The first substrate SUB1 and the second substrate SUB2 are formed in a flat-plate shape parallel to an X-Y plane. The first substrate SUB1 and the second substrate SUB2 overlap each other as seen in plan view, and are attached to each other by the sealant SE. The liquid crystal layer LC is held between the first substrate SUB1 and the second substrate SUB2, and is sealed by the sealant SE. In FIG. 1, the liquid crystal layer LC and the sealant SE are shown by different types of hatch lines.

As schematically shown in an enlarged view in FIG. 1, the liquid crystal layer LC consists of polymer dispersed liquid crystals containing polymers 31 and liquid crystal molecules 32. For example, the polymers 31 are liquid crystalline polymers. The polymers 31 are formed in a streaky shape extending in a first direction X and are arranged in a second direction Y. The liquid crystal molecules 32 are dispersed in the gaps of the polymers 31, and are aligned such that the long axes are parallel to the first direction X. Each of the polymers 31 and the liquid crystal molecules 32 has optical anisotropy or refractive anisotropy. The responsiveness of the polymers 31 for an electric field is lower than that of the liquid crystalline molecules 32 for an electric field.

For example, the alignment direction of the polymers 31 does not substantially change regardless of the presence or absence of an electric field. To the contrary, the alignment direction of the liquid crystal molecules 32 changes based on the voltage applied to the liquid crystal layer LC.

In a state where no voltage is applied to the liquid crystal layer LC, the optical axes of the polymers 31 are parallel to those of the liquid crystal molecule 32, and the incident light on the liquid crystal layer LC is not substantially scattered inside the liquid crystal layer LC and passes through the liquid crystal layer LC (transparent state).

In a state where voltage is applied to the liquid crystal layer LC, the optical axes of the polymers 31 intersect with those of the liquid crystal molecules 32, and the incident light on the liquid crystal layer LC is scattered inside the liquid crystal layer LC (scattered state).

The display panel PNL comprises a display area DA which displays an image, and a non-display area NDA which has a frame shape and surrounds the display area DA. The sealant SE is located in the non-display area NDA. The display area DA comprises a plurality of pixels PX arrayed in matrix in the first direction X and the second direction Y.

As shown in an enlarged view in FIG. 1, each pixel PX comprises a switching element SW, a pixel electrode PE, a common electrode CE and capacitance CS. The switching element SW consists of, for example, a thin-film transistor (TFT), and is electrically connected to a scanning line G and a signal line S.

The scanning line G extends in the first direction X, and is electrically connected to the switching element SW of each of the pixels PX arranged in the first direction X. The signal line S extends in the second direction Y, and is electrically connected to the switching element SW of each of the pixels PX arranged in the second direction Y.

The pixel electrode PE is electrically connected to the switching element SW. The common electrode CE is provided in common for a plurality of pixel electrodes PE. Each of the pixel electrodes PE faces the common electrode CE in a third direction Z. The liquid crystal layer LC (particularly, the liquid crystal molecules 32) is driven by the electric field generated between the pixel electrode PE and the common electrode CE. For example, the capacitance CS is formed between an electrode having the same potential as the common electrode CE and an electrode having the same potential as the pixel electrode PE.

In the present embodiment, the scanning line G, the signal line S, the switching element SW and the pixel electrode PE are provided in the first substrate SUB1, and the common electrode CE is provided in the second substrate SUB2. The scanning line G and the signal line S are electrically connected to the wiring board 1 or the IC chip 2.

The wiring board 1 is mounted on the extending portion Ex of the first substrate SUB1. The extending portion Ex corresponds to, of the first substrate SUB1, the portion which does not overlap the second substrate SUB2. The wiring board 1 is, for example, a flexible printed circuit which can be bent. The IC chip 2 is mounted on the wiring board 1. The IC chip 2 comprises, for example, a built-in display driver which outputs a signal necessary for image display. It should be noted that the IC chip 2 may be mounted on the extending portion Ex.

The light sources LC overlap the extending portion Ex as seen in plan view. These light sources LS are arranged at intervals in the first direction X. The light sources LS are provided along, of the second substrate SUB2, an end portion (side surface) E21 parallel to the first direction X, and emit light to the end portion E21.

Figure 2:
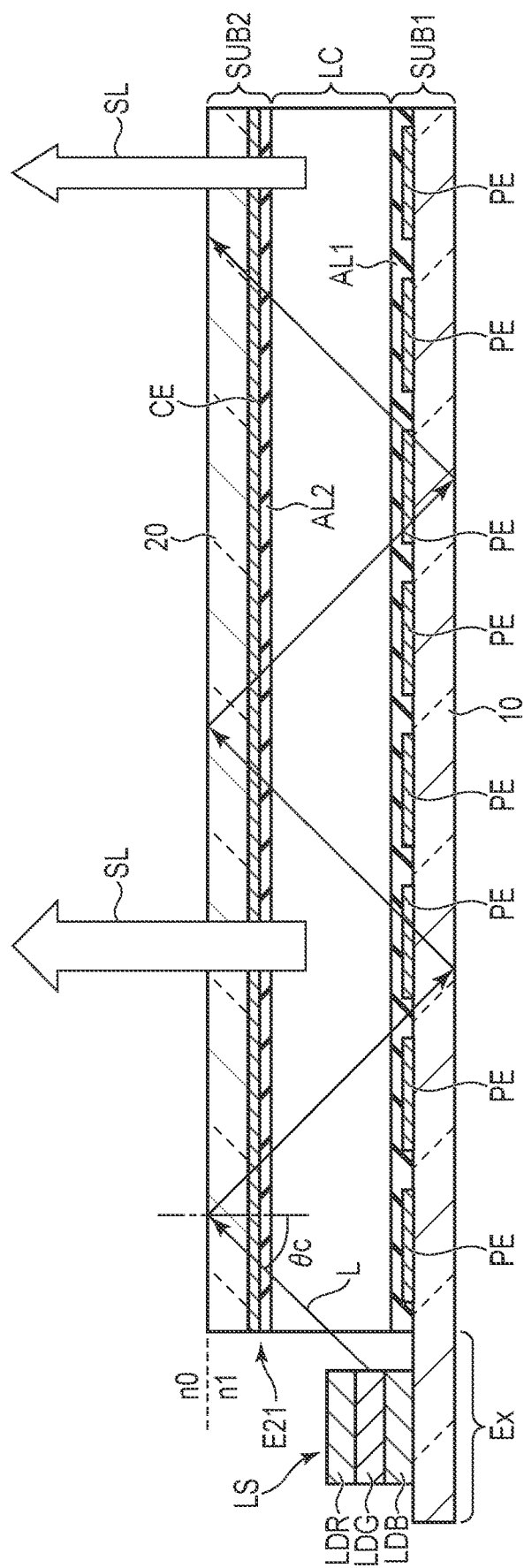
FIG. 2 is a schematic cross-sectional view of the display device according to the first embodiment.

FIG. 2 is a schematic cross-sectional view of the display device DSP. In this figure, the structure of the display panel PNL is schematically shown, and the elements of the scanning line G, the signal line S, the switching element SW, the sealant SE, the wiring board 1, etc., are omitted.

In the example of FIG. 2, the light source LS includes a light emitting element LDR which emits red light, a light emitting element LDG which emits green light and a light emitting element LDB which emits blue light. For these light emitting elements LDR, LDG and LDB, for example, light emitting diodes can be used.

The first substrate SUB1 comprises a first transparent substrate 10, the pixel electrodes PE described above, and a first alignment film AL1 which is in contact with the liquid crystal layer LC. The second substrate SUB2 comprises a second transparent substrate 20, the common electrode CE described above, and a second alignment film AL2 which is in contact with the liquid crystal layer LC. The first transparent substrate 10 and the second transparent substrate 20 may be formed of, for example, glass or plastic.

As shown in FIG. 2, light L emitted from the light source LS enters the display panel PNL, and is guided mainly in the second direction Y between the first substrate SUB1 and the second substrate SUB2 while repeating total reflection. For example, refractive index n0 of air is 1.0. Refractive index n1 of each of the first transparent substrate 10 and the second transparent substrate 20 is 1.5. The critical angle θc when light L is totally reflected on the interface between the first transparent substrate 10 and air and the interface between the second transparent substrate 20 and air is 42°.

Near a pixel PX in a transparent state, light L is not substantially scattered in the liquid crystal layer LC. Thus, light L does not substantially leak out of the first substrate SUB1 or the second substrate SUB2.

To the contrary, near a pixel PX in a scattered state, light L is scattered in the liquid crystal layer LC. This scattered light SL is emitted from the first substrate SUB1 and the second substrate SUB2 and is visually recognized as a display image. The gradation expression of the degree of scattering (luminance) can be realized by defining the voltage to be applied to the pixel electrodes PE in stages in a predetermined range.

It should be noted that, near a pixel in a transparent state, the external light which enters the first substrate SUB1 or the second substrate SUB2 is not substantially scattered and passes through these substrates. Thus, when the display panel PNL is viewed from the second substrate SUB2 side, the background on the first substrate SUB1 side can be visually recognized. When the display panel PNL is viewed from the first substrate SUB1 side, the background on the second substrate SUB2 side can be visually recognized.

As a system for displaying an image, for example, the following field sequential system could be used. The field sequential system repeats a first subframe in which a red image is displayed by lighting up the light emitting element LDR, a second subframe in which a green image is displayed by lighting up the light emitting element LDG and a third subframe in which a blue image is displayed by lighting up the light emitting element LDB.

Figure 3:
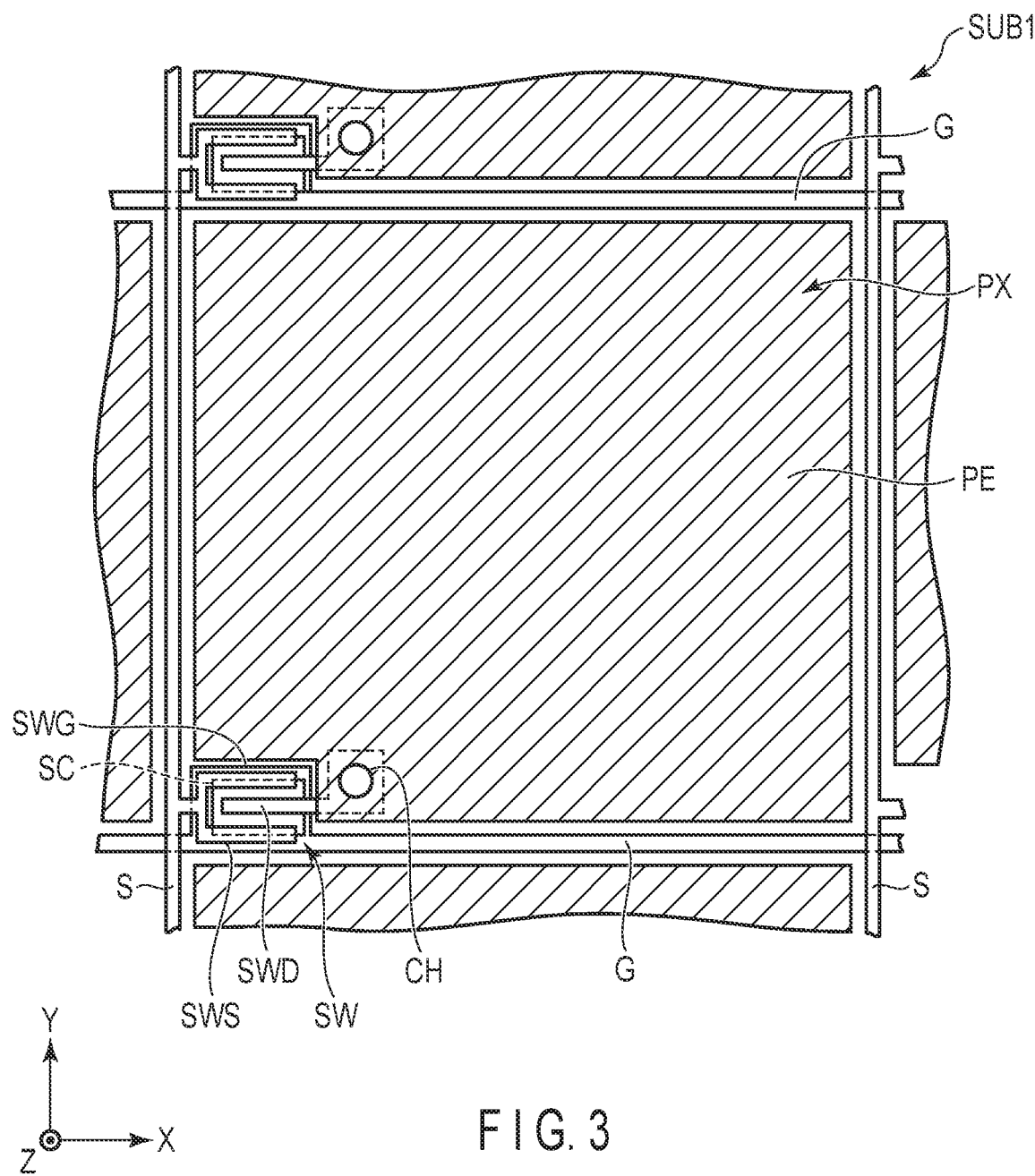
FIG. 3 is a plan view showing an example of a structure which could be applied to pixels according to the first embodiment.

FIG. 3 is a plan view showing an example of a structure which could be applied to pixels PX. The first substrate SUB1 comprises a plurality of scanning lines G and a plurality of signal lines S. Further, the first substrate SUB1 comprises, as the elements provided for each pixel PX, a switching element SW and a pixel electrode PE.

The scanning lines G extend in the first direction X and are arranged at intervals in the second direction Y. The signal lines S extend in the second direction Y and are arranged at intervals in the first direction X. The scanning lines G intersect with the signal lines S.

Each pixel PX corresponds to the area defined by two adjacent scanning lines G and two adjacent signal lines S. The switching element SW is provided in the intersection of the scanning line G and the signal line S. The switching element SW comprises a semiconductor layer SC. The semiconductor layer SC overlaps a gate electrode SWG electrically connected to the scanning line G. A source electrode SWS and a drain electrode SWD electrically connected to the signal line S are electrically connected to the semiconductor layer SC.

The pixel electrode PE is provided in the area surrounded by two adjacent scanning lines G and two adjacent signal lines S. The drain electrode SWD is electrically connected to the pixel electrode PE via a contact hole CH.

Figure 4:
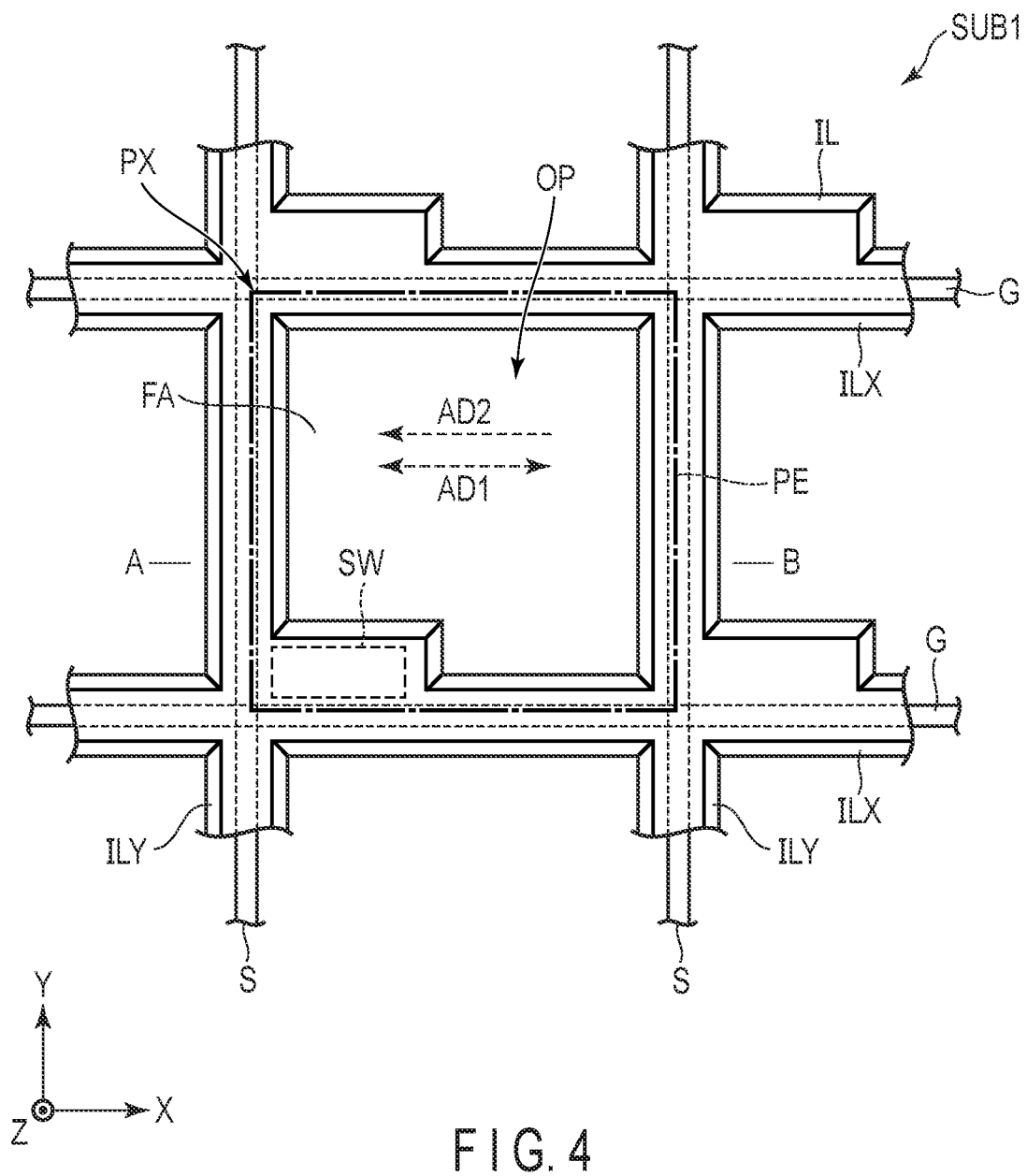
FIG. 4 is a schematic plan view of other elements which are provided in a first substrate and are not shown in FIG. 3 according to the first embodiment.

FIG. 4 is a schematic plan view of other elements provided in the first substrate SUB1. The first substrate SUB1 comprises an insulating layer IL. The insulating layer IL is formed in a grating shape defining an opening OP in each pixel PX. In other words, the insulating layer IL comprises first portions ILX extending in the first direction X, and second portions ILY extending in the second direction Y. The insulating layer IL overlaps each of the scanning lines G, the signal lines S and the switching elements SW.

In FIG. 4, the pixel electrode PE shown by one-dot chain lines is provided so as to overlap the opening OP. The peripheral portion of the pixel electrode PE overlaps the first portions ILX and the second portions ILY.

In the present embodiment, an alignment treatment is applied to the first alignment film AL1 such that the alignment direction is a first alignment direction AD1 by, for example, a photo-alignment treatment using polarized ultraviolet light or visible light. An alignment treatment is applied to the second alignment film AL2 such that the alignment direction is a second alignment direction AD2 by a rubbing alignment treatment. The first alignment direction AL1 and the second alignment direction AD2 are parallel to the first direction X.

The first alignment film AL1 comprises a flat area FA in each pixel PX. The flat area FA is surrounded by two adjacent scanning lines G and two adjacent signal lines S. More specifically, the flat area FA corresponds to, of the first alignment film AL1, the portion which overlaps the opening OP, and is surrounded by the insulating layer IL. In the flat area FA, the surface of the first alignment film AL1 is substantially parallel to the horizontal plane (X-Y plane) of the first substrate SUB1.

Figure 5:
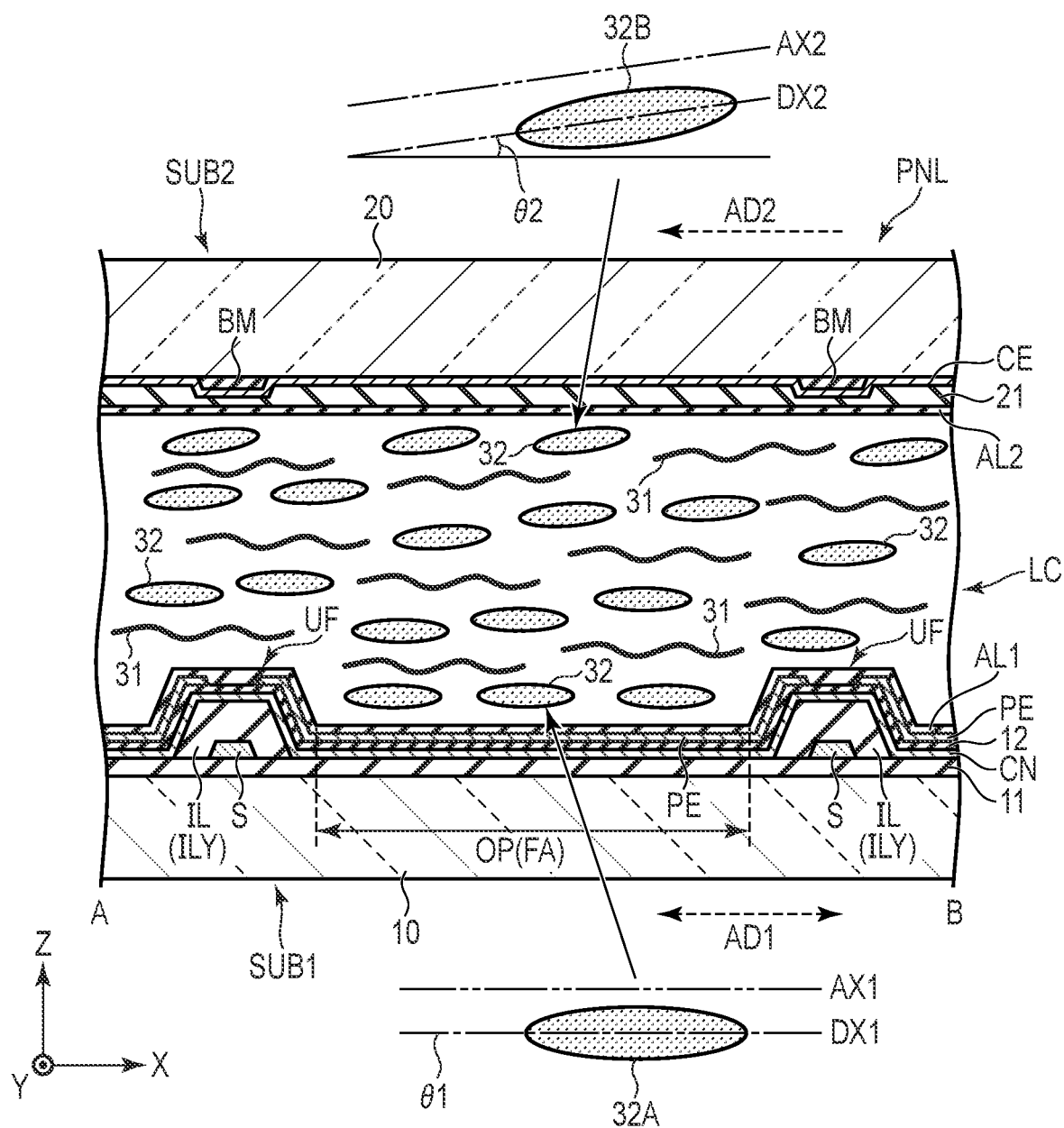
FIG. 5 is a schematic cross-sectional view of a display panel along the A-B line of FIG. 4.

FIG. 5 is a schematic cross-sectional view of the display panel PNL along the A-B line of FIG. 4. The first substrate SUB1 comprises insulating layers 11 and 12 and a capacitive electrode CN in addition to the first transparent substrate 10, insulating layer IL, first alignment film AL1, scanning line G, signal line S and pixel electrode PE described above.

The insulating layer 11 is provided on the first transparent substrate 10. The insulating layer 11 could include a plurality of inorganic films which separate the semiconductor layer SC of the switching element SW, the scanning line G and the signal line S from each other. The signal line S is provided on the insulating layer 11 and is covered with the second portion ILY of the insulating layer IL. The capacitive electrode CN is provided on the insulating layer 11 and the insulating layer IL and is covered with the insulating layer 12.

The pixel electrode PE is provided on the insulating layer 12 in the opening OP and is covered with the first alignment film AL1. The pixel electrode PE faces the capacitive electrode CN across the intervening insulating layer 12 and forms the capacitance CS of the pixel PX.

The second substrate SUB2 comprises a light shielding layer BM and an insulating layer 21 in addition to the second transparent substrate 20, common electrode CE and second alignment film AL2 described above. The light shielding layer BM is provided on the main surface of the second transparent substrate 20. For example, the light shielding layer BM has a grating shape which overlaps the signal line S, the scanning line G and the switching element SW in the third direction Z.

The common electrode CE is provided on the main surface of the second transparent substrate 20 and covers the light shielding layer BM. The insulating layer 21 covers the common electrode CE. The second alignment film AL2 covers the insulating layer 21. The common electrode CE faces a plurality of pixel electrodes PE. The common electrode CE has the same potential as the capacitive electrode CN.

Each of the insulating layers 11, 12 and 21 is formed of, for example, a transparent inorganic material such as silicon oxide, silicon nitride or silicon oxynitride. The insulating layer IL if formed of, for example, a transparent organic material such as acrylic resin. Each of the capacitive electrode CN, the pixel electrode PE and the common electrode CE is formed of a transparent conductive material such as indium tin oxide (ITO) or indium zinc oxide (IZO). The light shielding layer BM is formed of, for example, a material having a light shielding property such as a metal in which the reflectance of visible light is low, or black resin.

The liquid crystal molecules 32 shown in FIG. 5 correspond to a state in which no potential difference is formed between the pixel electrode PE and the common electrode CE. When a potential difference is formed between the pixel electrode PE and the common electrode CE, each liquid crystal molecule 32 rotates such that the director (the direction of the long axis) comes to the direction of the electric field.

The liquid crystal molecule 32A shown on the lower side of FIG. 5 is a liquid crystal molecule located near the flat area FA. The phrase "near the flat area FA" refers to, of the liquid crystal layer LC, a portion over which the alignment restriction force of the first alignment film AL1 is dominantly exerted compared to the alignment restriction force of the second alignment film AL2 before or after the formation of the polymers 31. For example, of the liquid crystal layer LC, at least the portion which is located on the lower side of the figure (in other words, on the first transparent substrate 10 side) than the upper surface UF of the protrusion generated by the insulating layer IL in the first alignment film AL can be regarded as the portion near the flat area FA.

The liquid crystal molecule 32A comprises a first director DX1. Further, each polymer 31 located near the flat area FA comprises a first stretch axis AX1. In the present embodiment, the alignment restriction force of the first alignment film AL1 is imparted by a photo-alignment treatment. In this case, when the liquid crystal layer LC is formed through the manufacturing process described later, the first directors DX1 and the first stretch axes AX are substantially parallel to the horizontal plane (X-Y plane) of the first substrate SUB1 in a state where no potential difference is formed between the pixel electrode PE and the common electrode CE. In other words, pretilt angle θ1 of the liquid crystal molecule 32A is substantially zero.

It should be noted that pretilt angle θ1 is not necessarily zero in all of the many liquid crystal molecules 32 located near the flat area FA. In practice, each liquid crystal molecule 32 could have a slight tilt. The expression "the first directors DX1 are substantially parallel to the horizontal plane" means that the directors of the many liquid crystal molecules 32 located near the flat area FA do not incline in a specific direction in the same manner and these directors are parallel to the horizontal plane on average.

Similarly, the expression "the first stretch axes AX1 are substantially parallel to the horizontal plane" means that the stretch axes of the many polymers 31 located near the flat area FA do not incline in a specific direction in the same manner and these stretch axes are parallel to the horizontal plane on average.

The liquid crystal molecule 32B shown on the upper side of FIG. 5 is a liquid crystal molecule located near the second alignment film AL2. The phrase "near the second alignment film AL2" refers to, of the liquid crystal layer LC, a portion over which the alignment restriction force of the second alignment film AL2 is dominantly exerted compared to the alignment restriction force of the first alignment film AL1 before or after the formation of the polymers 31.

The liquid crystal molecule 32B comprises a second director DX2. Further, each polymer 31 located near the second alignment film AL2 comprises a second stretch axis AX2. In the present embodiment, the alignment restriction force of the second alignment film AL2 is imparted by a rubbing alignment treatment. In this case, when the liquid crystal layer LC is formed through the manufacturing process described later, the second directors DX2 and the second stretch axes AX2 could have a pretilt angle θ2 of, for example, approximately 1° to 2° on average in a state where no potential difference is formed between the pixel electrode PE and the common electrode CE. Thus, in the present embodiment, each of the second directors DX2 and the second stretch axes AX2 inclines with respect to the horizontal plane of the first substrate SUB1 and the second substrate SUB2.

Although FIG. 5 shows the structure of only one pixel PX (pixel electrode PE), the directors of the liquid crystal molecules 32 and the stretch axes of the polymers 31 near the flat area FA are substantially parallel to the horizontal plane in other pixels PX of the display area DA, preferably in all of the pixels PX.

Now, this specification explains an example of the manufacturing method of the display device DSP.

Figure 6:
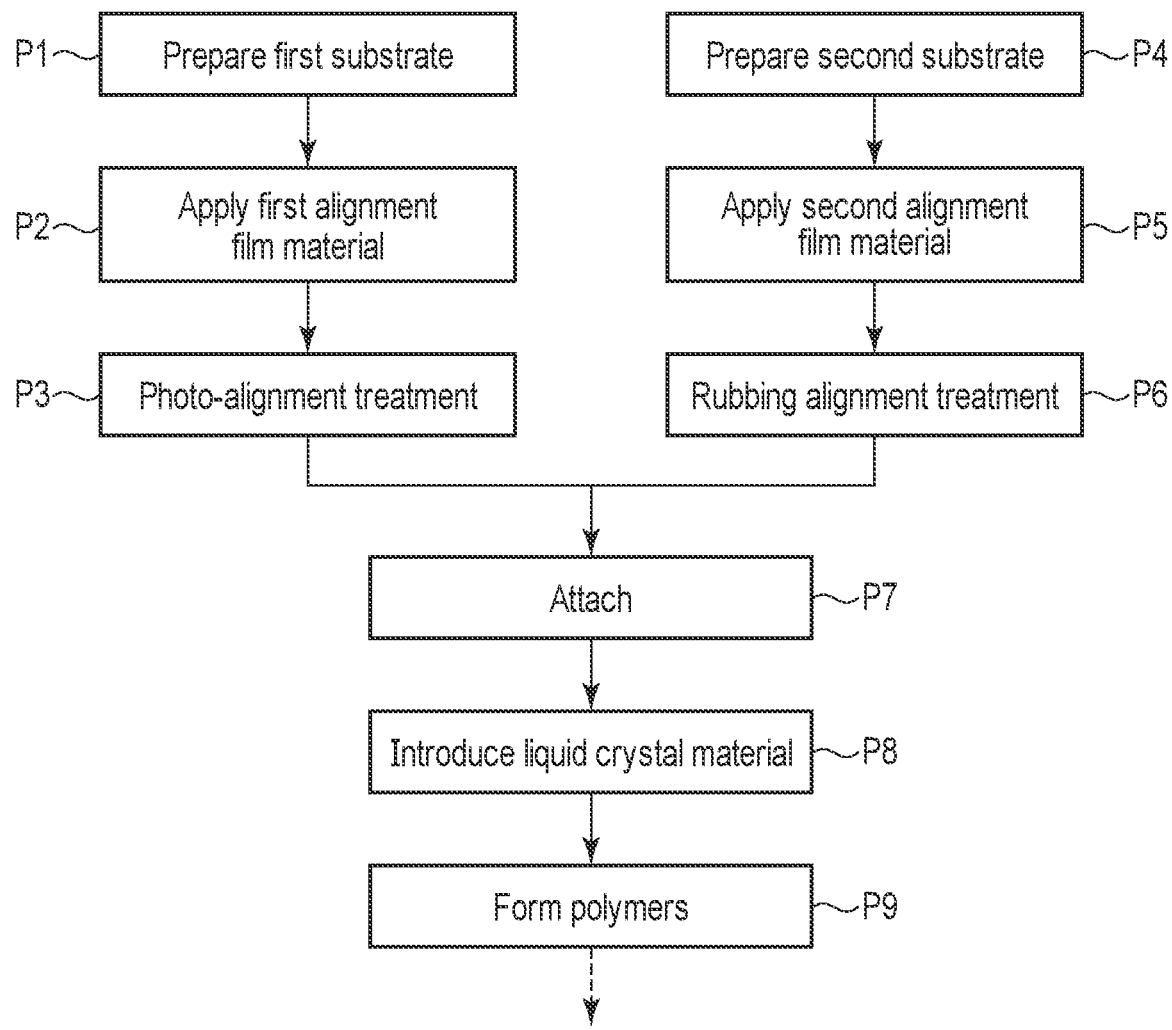
FIG. 6 is a flowchart showing part of the manufacturing process of the display device according to the first embodiment.

FIG. 6 is a flowchart showing part of the manufacturing process of the display device DSP. To manufacture the display device DSP, first, the first substrate SUB1 comprising the pixel electrode PE, etc., is prepared (process P1). At this point, the first alignment film AL1 is not formed in the first substrate SUB1.

Subsequently, a first alignment film material is applied to the first substrate SUB1 (process P2). Further, a photo-alignment treatment is applied to the first alignment film material (process P3). In the photo-alignment treatment, for example, polarized ultraviolet light or visible light is emitted to the first alignment film material. Through this photo-alignment treatment, the first alignment film AL1 to which an alignment restriction force parallel to the first alignment direction AD1 is imparted is formed.

Aside from the implementation of processes P1, P2 and P3, the second substrate SUB2 including the common electrode CE, etc., is prepared (process P4). At this point, the second alignment film AL2 is not formed in the second substrate SUB2.

Subsequently, a second alignment film material is applied to the second substrate SUB2 (process P5). Further, a rubbing alignment treatment is applied to the second alignment film material (process P6). The second alignment film material may be different from or the same as the first alignment film material. Through the rubbing alignment treatment, the second alignment film AL2 to which an alignment restriction force parallel to the second alignment direction AD2 is imparted is formed.

After the formation of the first alignment film AL1 and the second alignment film AL2, the first substrate SUB1 is attached to the second substrate SUB2 by the sealant SE (process P7). Further, a liquid crystal material containing liquid crystal molecules 32 and polymerizable monomers is introduced between the first substrate SUB1 and the second substrate SUB2 (process P8).

For example, the liquid crystal material is injected from an injection port provided in the sealant SE in a vacuum environment. Alternatively, the liquid crystal material may be dropped in the area surrounded by the sealant SE applied to the first substrate SUB1 or the second substrate SUB2 before the first substrate SUB1 is attached to the second substrate SUB2.

After the attachment of the first substrate SUB1 and the second substrate SUB2, the polymers 31 are formed in the liquid crystal material (process P9). Specifically, ultraviolet light is emitted to the liquid crystal material. By this process, the polymerizable monomers contained in the liquid crystal material are polymerized, and the streaky polymers 31 containing polymer chains are generated.

When process P9 is performed, the polymerizable monomers are aligned in the alignment directions AD1 and AD2 by the alignment restriction forces of the first alignment film AL1 and the second alignment film AL2. After the formation of the polymers 31, the alignment of the liquid crystal molecules 32 is controlled mainly by the polymers 31.

The liquid crystal molecules 32 or polymerizable monomers do not substantially tilt near the first alignment film AL1 to which the alignment restriction force is imparted by the photo-alignment treatment. Thus, the directors of the liquid crystal molecules 32 and the stretch axes of the polymers 31 are substantially parallel to the horizontal plane of the first substrate SUB1 near the flat area FA even after the irradiation with ultraviolet light.

To the contrary, the liquid crystal molecules 32 and polymerizable monomers tilt at a predetermined angle near the second alignment film AL2 to which the alignment restriction force is imparted by the rubbing alignment treatment. Thus, the directors of the liquid crystal molecules 32 and the stretch axes of the polymers 31 incline with respect to the horizontal plane of the first substrate SUB1 and the second substrate SUB2 near the second alignment film AL2 even after the irradiation with ultraviolet light.

After process P9, the process of mounting the wiring board 1 and providing the light sources LS on the display panel PNL is performed. Through this process, the display device DSP is completed.

In the above present embodiment, an alignment restriction force is imparted to the first alignment film AL1 of the first substrate SUB1 by a photo-alignment treatment. Since the first substrate SUB1 includes the scanning line G, the signal line S, the switching element SW, etc., irregularities are easily formed on the surface of the first alignment film AL1. When the insulating layer IL shown in FIG. 4 and FIG. 5 is formed, these irregularities are more conspicuous. If a rubbing alignment treatment is applied to such a first alignment film AL1, the portion of the irregularities or its vicinity is not sufficiently rubbed. Thus, an alignment failure could be caused in the polymers 31 or the liquid crystal molecules 32. The alignment failure ranges even near the flat area FA. Thus, the reduction in the contrast ratio is caused by light leakage or unnecessary scattered light.

To the contrary, when a photo-alignment treatment is applied to the first alignment film AL1, an alignment restriction force can be satisfactorily imparted to even the portion of the irregularities and its vicinity. As a result, the alignment failure of the first alignment film AL1 is prevented. As explained with reference to FIG. 5, the directors of the liquid crystal molecules 32 and the stretch axes of the polymers 31 near the flat area FA are parallel to the horizontal plane. According to the display device DSP in which an alignment failure is prevented, the display quality can be improved.

It should be noted that the second alignment film AL2 has less irregularities than the first alignment film AL'. Therefore, even when a rubbing alignment treatment is applied to the second alignment film AL2 like the present embodiment, an alignment failure does not easily occur near the second alignment film AL2.

When a spacer for maintaining the cell gap of the liquid crystal layer LC is provided in the first substrate SUB1, the alignment failure of irregularities by this spacer can be also prevented by applying a photo-alignment treatment to the first alignment film ALL Second Embodiment A second embodiment is explained. The configurations or effects which are not particularly referred to are the same as those of the first embodiment.

Figure 7:
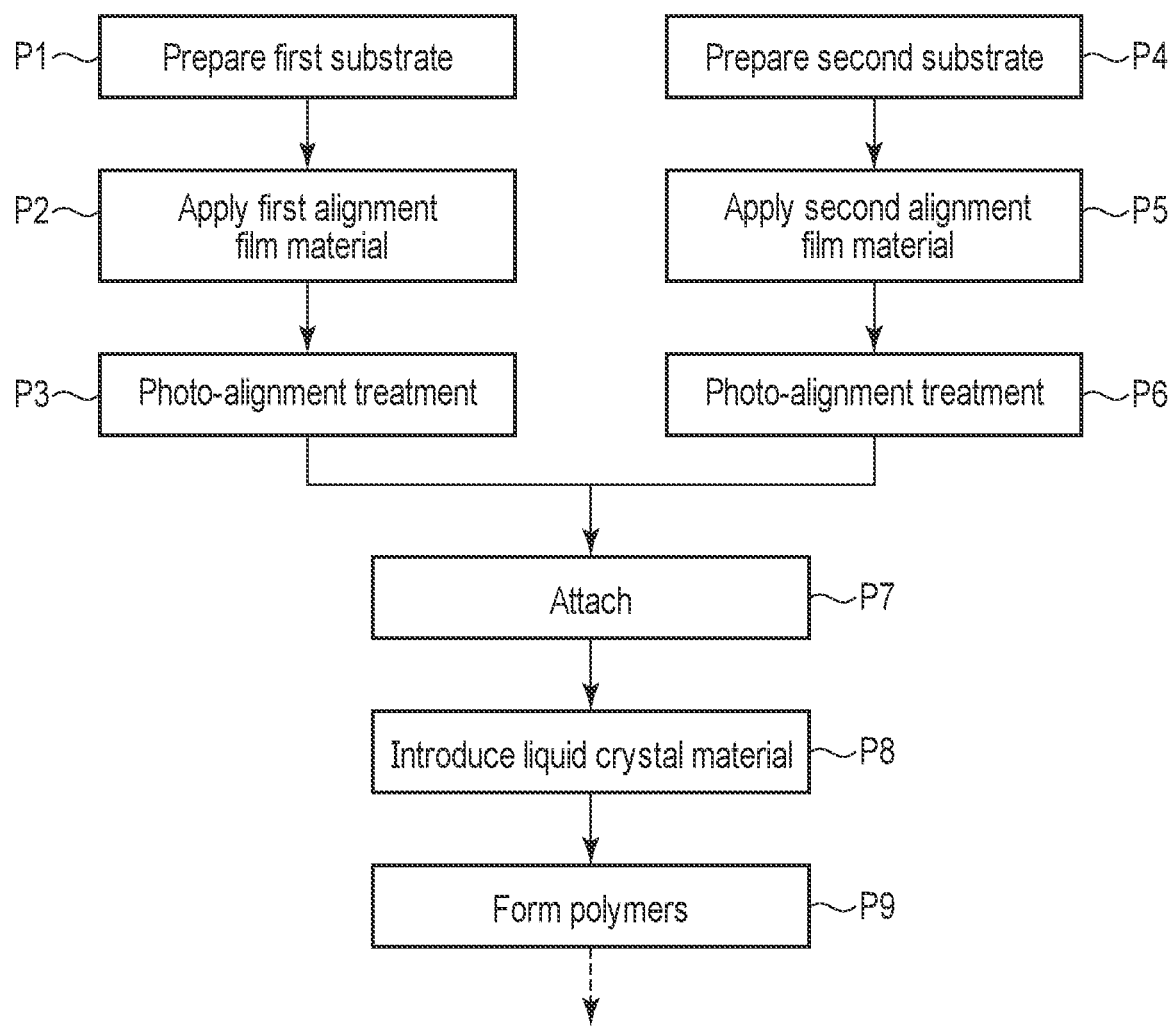
FIG. 7 is a flowchart showing part of the manufacturing process of a display device according to a second embodiment.

FIG. 7 is a flowchart showing part of the manufacturing process of a display device DSP according to the present embodiment. Processes P1 to P5 and P7 to P9 in FIG. 7 are similar to those explained with reference to FIG. 6.

In the present embodiment, a photo-alignment treatment is applied to a second alignment film material in process P6. In this photo-alignment treatment, for example, polarized ultraviolet light or visible light is emitted to the second alignment film material. Through this photo-alignment treatment, a second alignment film AL2 to which an alignment restriction force parallel to a second alignment direction AD2 is imparted is formed.

Figure 8:
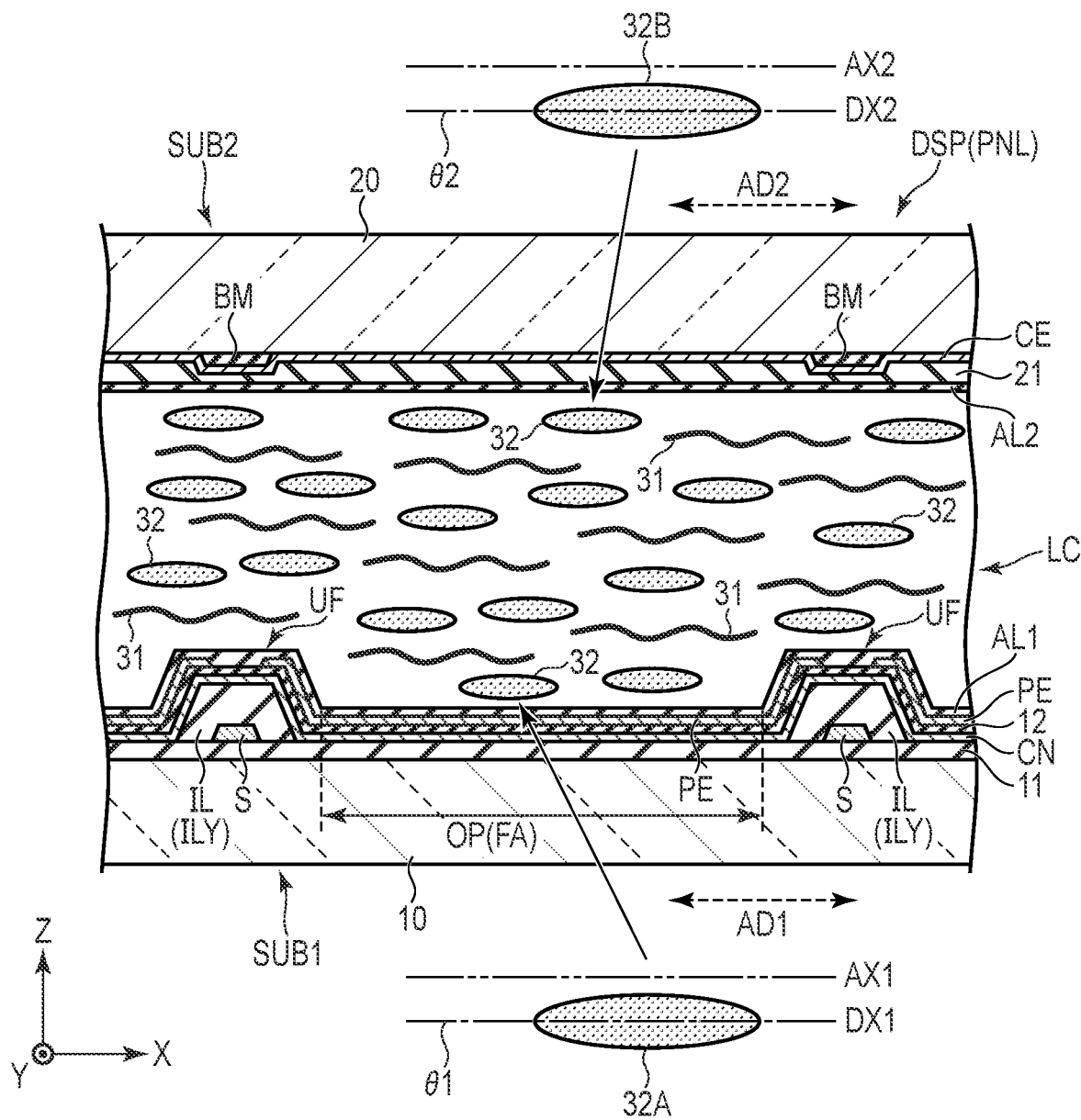
FIG. 8 is a schematic cross-sectional view of the display device according to the second embodiment.

FIG. 8 is a schematic cross-sectional view of the display device DSP according to the present embodiment. Since an alignment restriction force is imparted to the second alignment film AL2 as well by a photo-alignment treatment, the second director DX2 of a liquid crystal molecule 32B near the second alignment film AL2 is substantially parallel to the horizontal plane (X-Y plane) of a first substrate SUB1 and a second substrate SUB2. In other words, pretilt angle $\theta 2$ of the liquid crystal molecule 32B is substantially zero. The second stretch axes AX2 of polymers 31 near the second alignment film AL2 are also substantially parallel to the horizontal plane.

An alignment restriction force is also imparted to a first alignment film AL1 by a photo-alignment treatment in a manner similar to that of the first embodiment. Therefore, in the present embodiment, the average pretilt angle of the entire liquid crystal layer LC is zero.

Effects which are obtained from the present embodiment are explained below.

Figure 9:
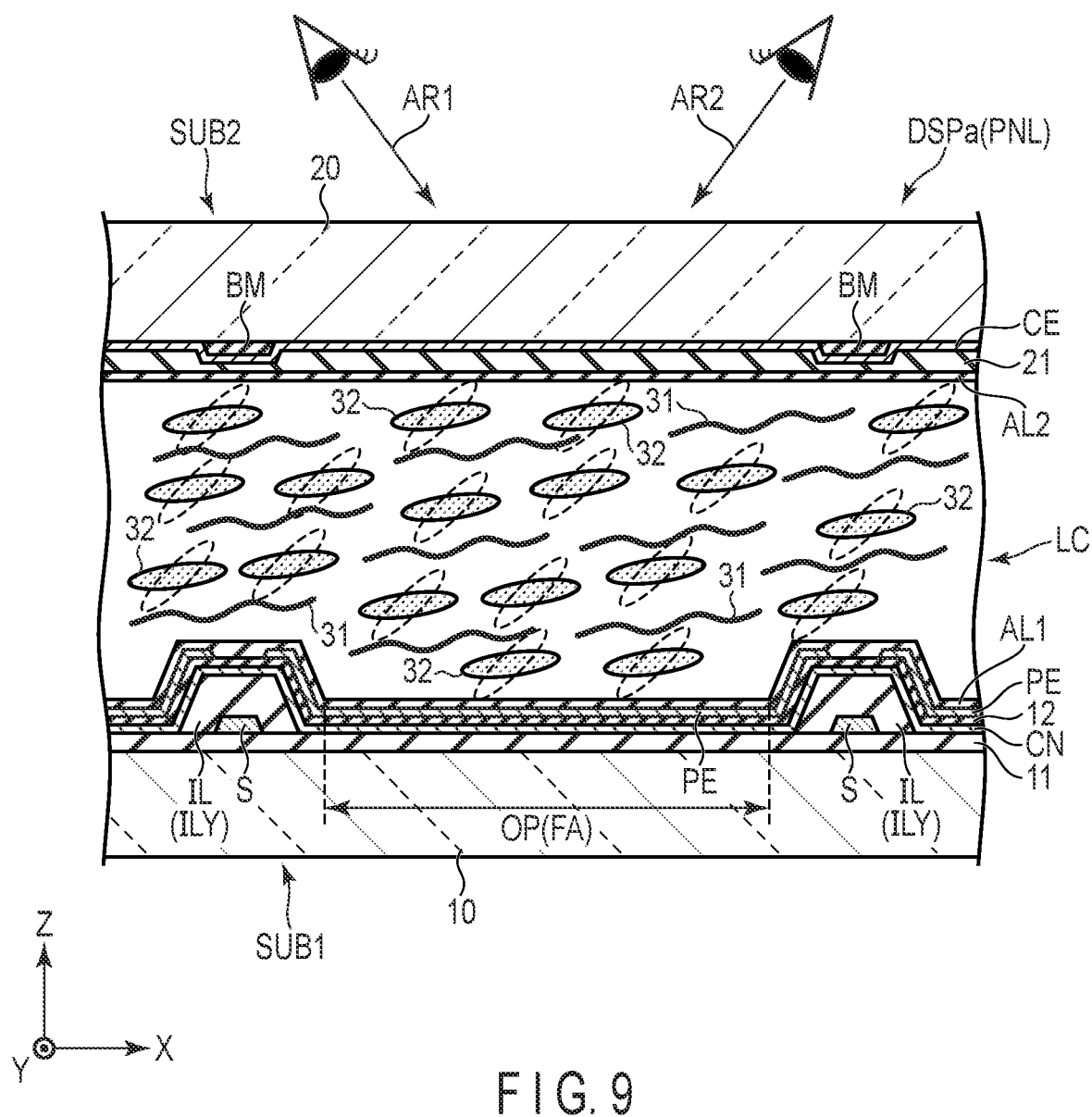
FIG. 9 is a schematic cross-sectional view of a display device according to a comparative example.

FIG. 9 is a schematic cross-sectional view of a display device DSPa according to a comparative example. The structure of the display device DSPa is generally the same as that of the display device DSP. However, the display device DSPa is different from the display device DSP in respect that an alignment restriction force is imparted to both the first alignment film AL1 and the second alignment film AL2 by a rubbing alignment treatment. In this case, the polymers 31 and the liquid crystal molecules 32 tilt in a predetermined direction in various places of a liquid crystal layer LC. In the example of FIG. 9, the polymers 31 and the liquid crystal molecules 32 uniformly tilt to the upper right side.

When voltage is applied to this liquid crystal layer LC, the liquid crystal molecules 32 rise as shown by broken lines. Since the liquid crystal molecules 32 uniformly tilt when no voltage is applied, the rotation directions of the liquid crystal molecules 32 are uniform, and anisotropy is caused in the rising direction. Thus, anisotropy may be also caused for the scattering of light, and the symmetric property of the viewing angle of the luminance may be degraded.

Specifically, the luminance which is visually appreciated by humans differs between a case where pixels PX in a scattered state are viewed in the direction shown by arrow AR1 of the figure and a case where the pixels PX in a scattered state are viewed in the direction shown by arrow AR2.

Figure 10:
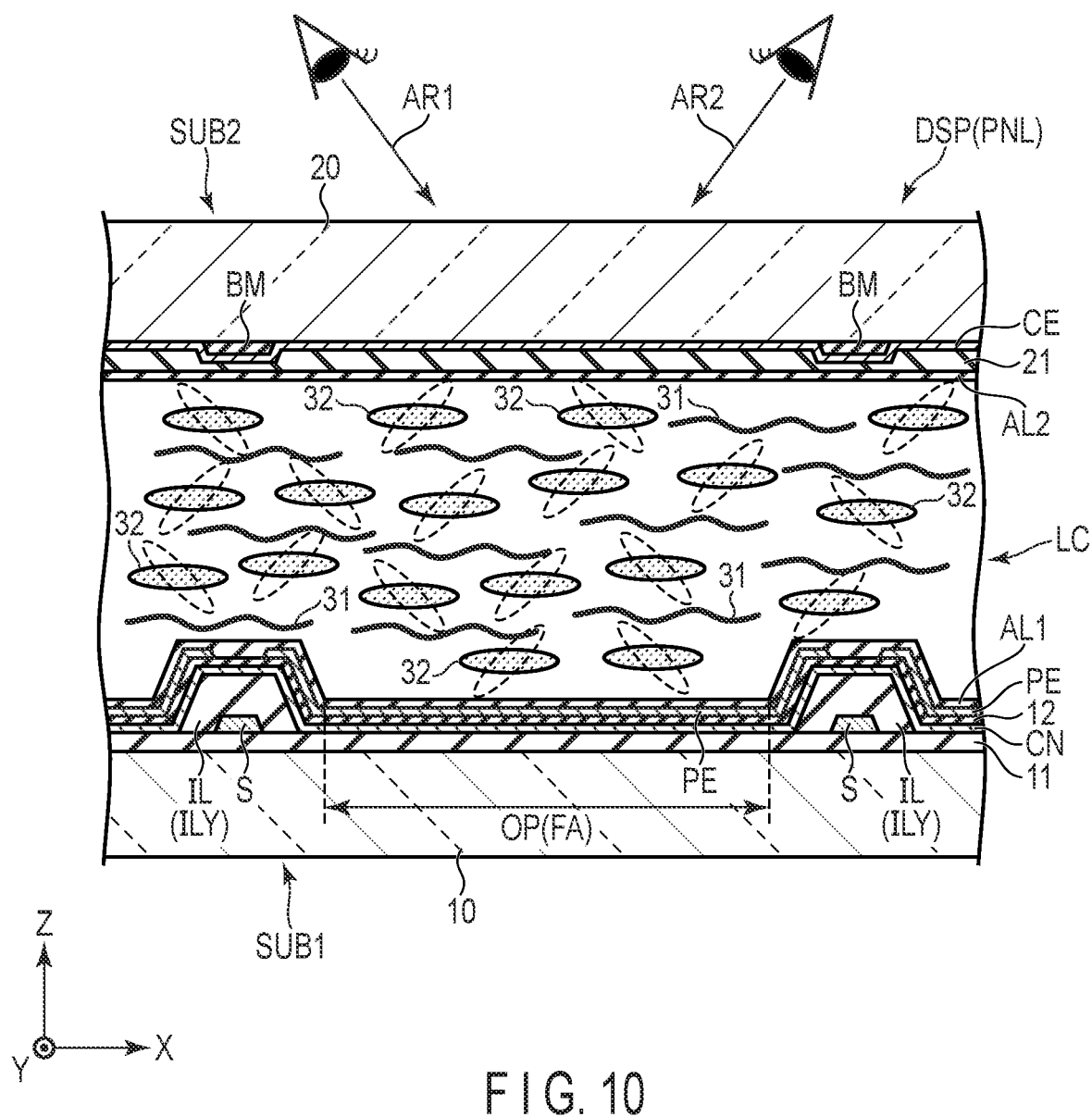
FIG. 10 is a schematic cross-sectional view showing the state in which liquid crystal molecules rise in the display device according to the second embodiment.

FIG. 10 is a schematic cross-sectional view showing the state in which the liquid crystal molecules 32 rise in the display device DSP according to the present embodiment. In the present embodiment, the pretilt angles of the liquid crystal molecules 32 are zero in various places of the liquid crystal layer LC. Therefore, when voltage is applied to the liquid crystal layer LC, both liquid crystal molecules 32 which rotate clockwise in the figure and liquid crystal molecules 32 which rotate counterclockwise are present.

As a result, as shown by broken lines, the directions in which the liquid crystal molecules 32 rise are random. Thus, isotropic scattering occurs. Therefore, when the pixels PX in a scattered state are viewed in the direction of either arrow AR1 or arrow AR2, the luminance which is visually appreciated by humans is substantially the same. Thus, the symmetric property of the viewing angle is improved.

Further, when a photo-alignment treatment is applied to the second alignment film AL2 like the present embodiment, an alignment restriction force can be satisfactorily imparted to even the portion of the irregularities generated on the surface of the second alignment film AL2 and its vicinity. From this configuration, similarly, the improvement of the display quality of the display device DSP can be expected.

Third Embodiment

A third embodiment is explained. The configurations or effects which are not particularly referred to are the same as those of the first embodiment or the second embodiment.

As shown in FIG. 2, light L emitted from a light source LS is guided while repeating total reflection inside a display panel PNL. In the process of this light guiding, light L is partially absorbed by a first alignment film AL1 and a second alignment film AL2. If the amount of this absorption is large, the luminance could be decreased in an area distant from the light source LS (luminance gradient). In addition, when light of a specific color is easily absorbed, a chromaticity deviation could be caused in a display area DA. The amount of absorption of light L by the first alignment film AL1 and the second alignment film AL2 depends on the transmittances of these alignment films AL1 and AL2.

FIG. 11 and FIG. 12 are graphs showing examples of the transmittance spectra of alignment films formed of different types of alignment film materials. In both graphs, the horizontal axis shows the wavelength (nm) of light, and the vertical axis shows the transmittance (%). As shown in these graphs, the transmittance is less as the wavelength of light is shorter.

In particular, when the spectra are compared to each other with respect to 700 nm, which is the wavelength of red light, 546 nm, which is the wavelength of green light, and 450 nm, which is the wavelength of blue light, the difference between the spectra is large around 450 nm. The transmittance around 450 nm is approximately 99% in FIG. 11 and is approximately 97% in FIG. 12.

In both the first embodiment and the second embodiment, at least one of the first alignment film AL1 and the second alignment film AL2 should be preferably formed of an alignment film material in which the transmittance of the light having a wavelength of 450 nm is greater than or equal to 98%. When an alignment film material having an excellent transmittance is used in this manner, the absorption of light by the first alignment film AL1 and the second alignment film AL2 is suppressed, thereby reducing the luminance gradient or chromaticity deviation in the display area DA.

For alignment films provided in general liquid crystal display devices, properties such as a high alignment property, resistance to wear and a desired volume resistance are required. To satisfy these requirements, general alignment films contain various acid components and diamine components. These components may increase light absorption and decrease the transmittance. In addition, thick alignment films may decrease the transmittance.

To the contrary, the main property required for the first alignment film AL1 and the second alignment film AL2 of the display device DSP using polymer dispersed liquid crystals is an alignment property which is needed for the polymerization of polymerizable monomers. These alignment films contain less light-absorptive components, and are satisfactory when they are specialized for an alignment component. When light-absorptive components are decreased, the thicknesses of the alignment films are also reduced.

Here, the manufacturing processes of the alignment films AL1 and AL2 (corresponding to processes P2, P3, P5 and P6 of FIG. 7) are more specifically explained using an example in which both the first alignment film AL1 and the second alignment film AL2 are formed of the same alignment film material, and further, a photo-alignment treatment is applied to these alignment films AL1 and AL2.

In processes P2 and P5, alignment film materials (the first alignment film material and second alignment film material described above) are applied to the top surfaces of the first substrate SUB1 and the second substrate SUB2, respectively, by, for example, a spin coating method, a printing method or an ink-jet method. Subsequently, these alignment film materials are dried by heating, etc., to sufficiently eliminate the contained organic solvent. After the organic solvent is eliminated, the alignment film materials are polymerized by applying a heating treatment to the alignment film materials at a higher temperature.

In processes P3 and P6, ultraviolet light or visible light is emitted to the surfaces to which the alignment film materials have been applied. The wavelength of ultraviolet light or visible light should be, for example, greater than or equal to 100 nm but less than or equal to 800 nm. This wavelength should be desirably greater than or equal to 100 nm but less than or equal to 400 nm, more desirably greater than or equal to 200 nm but less than or equal to 400 nm.

The alignment film materials are partially decomposed by this irradiation with ultraviolet light or visible light. By the portion (component) which is left by the decomposition, an alignment restriction force for the liquid crystal layer LC is imparted to the first alignment film AL1 and the second alignment film AL2. Subsequently, another treatment such as a heating treatment may be applied depending on the need.

The above alignment film materials contain a photolysis component PD and a non-decomposition component ND. The photolysis component PD comprises a transparent component (first transparent component) TM1 and a coloring component (first coloring component) CM1. The contained amount of the photolysis component PD is greater than or equal to 20 mol % but less than mol % with respect to 1 mol of the entire structure unit of each alignment film material.

The photolysis component PD is decomposed at the time of the irradiation with ultraviolet light or visible light. By the component which is left by the decomposition, an alignment restriction force for the liquid crystal molecules 32 is generated. Thus, the photolysis component PD can be also referred to as an alignment component.

The coloring component CM1 corresponds to the light-absorptive component described above. The contained amount of the coloring component CM1 should be less than or equal to 10 mol % of the entire alignment film material.

The photolysis component PD contains a polyamide acid or polyamide acid ester comprising the structure unit shown in the following formula (P1).

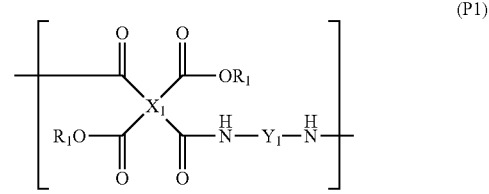

In formula (P1), X1 denotes a quadrivalent organic group. Quadrivalent organic group X1 is one of formula (X1-1) to formula (X1-4). The symbol R1 denotes a hydrogen atom or an alkyl group having 1 to 4 carbon atoms. Each of R3 to R23 independently denotes a hydrogen atom, a halogen atom, an alkyl group having 1 to 6 carbon atoms, an alkenyl group having 2 to 6 carbon atoms, an alkynyl group having 2 to 6 carbon atoms, a monovalent organic group containing a fluorine atom and having 1 to 6 carbon atoms or a phenyl group. They may be the same as each other or different from each other.

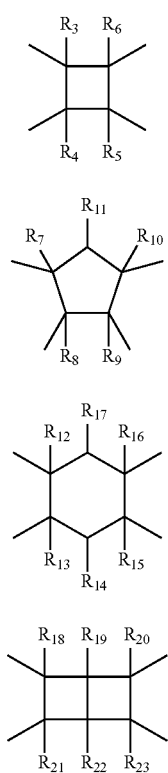

For the specific structure of formula (X1-1), the structures shown by formula (X1-11) to formula (X1-17) described below are considered. In particular, formula (X1-11), formula (X1-12) and formula (X1-13) are desirable.

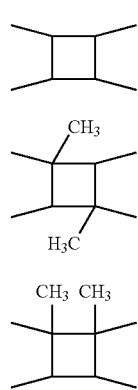

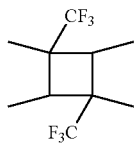

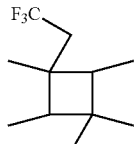

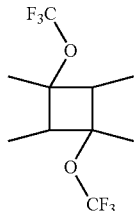

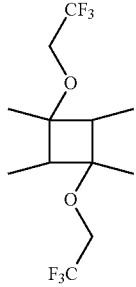

The photolysis component PD contains a polyamide acid or polyamide acid ester comprising the structure unit shown in formula (P1) as the coloring component CM1. The coloring component CM1 contains a polyamide acid or polyamide acid ester containing an atom having an electronegativity of 3 or greater, such as nitrogen (N), oxygen (O), fluorine (F) or chlorine (Cl). When, of divalent organic group Y1, a diamine is contained, the atom having an electronegativity of 3 or greater is contained in the portion other than the amine of the diamine. The contained amount of the coloring component CM1 is less than 10 mol % with respect to 1 mol of the entire structure unit of each alignment film material.

The non-decomposition component ND comprises a transparent component (second transparent component) TM2 and a coloring component (second coloring component) CM2. The coloring component CM2 corresponds to the light-absorptive component described above. The contained amount of the coloring component CM2 should be less than or equal to 10 mol % of the entire alignment film material.

The non-decomposition component ND contains a polyamide acid or polyamide acid ester comprising the structure unit shown in the following formula (N1). The contained amount of the non-decomposition component ND is greater than 50 mol % but less than or equal to mol % with respect to 1 mol of the entire structure unit of each alignment film material.

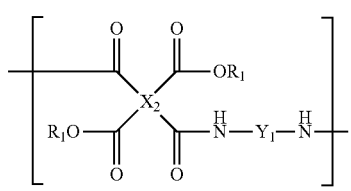

(N1)

In formula (N1), X2 denotes a quadrivalent organic group. Quadrivalent organic group X2 is one of formula (X2-1) to formula (X2-22).

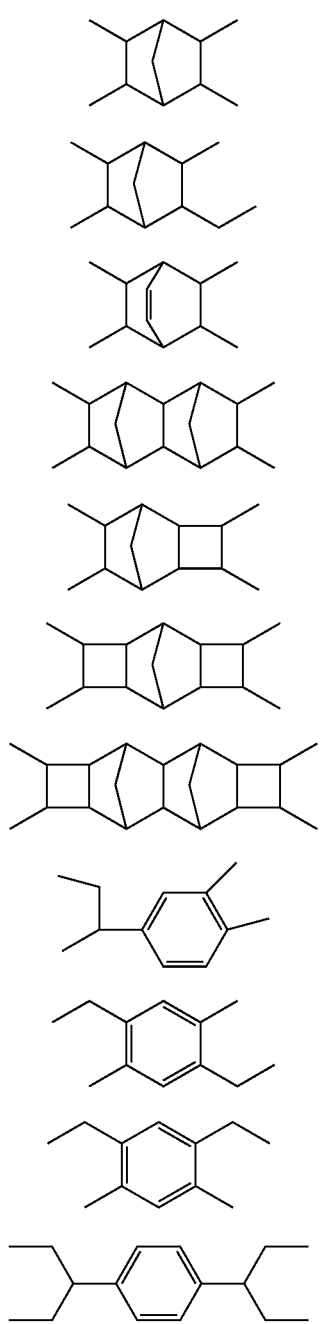

(X2-1), (X2-2), (X2-3), (X2-4), (X2-5), (X2-6), (X2-7), (X2-8), (X2-9), (X2-10), (X2-11)

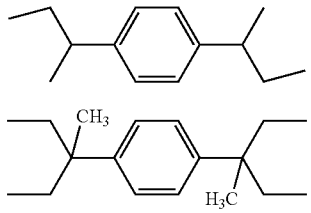

(X2-12), (X2-13)

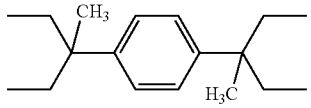

(X2-14)

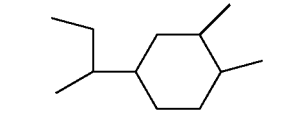

(X2-15)

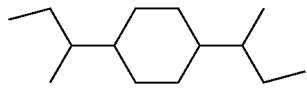

(X2-16)

(X2-17)

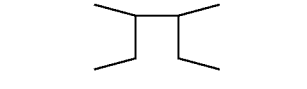

(X2-18)

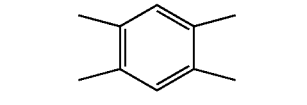

(X2-19)

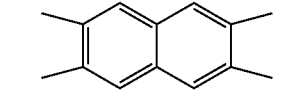

(X2-20)

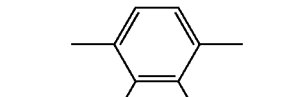

(X2-21)

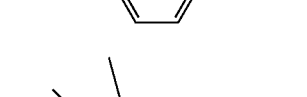

(X2-22)

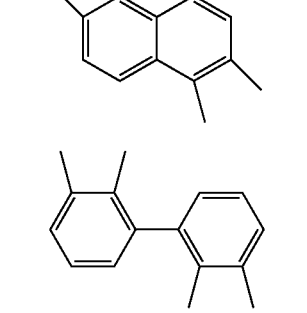

The non-decomposition component ND contains a polyamide acid or polyamide acid ester comprising the structure unit shown in formula (N1) as the coloring component CM2. The coloring component CM2 contains a 10 polyamide acid or polyamide acid ester containing an atom having an electronegativity of 3 or greater, such as nitrogen (N), oxygen (O), fluorine (F) or chlorine (Cl). When, of divalent organic group Y1, a diamine is contained, the atom having an electronegativity of 3 or 15 greater is contained in the portion other than the amine of the diamine. The contained amount of the coloring component CM2 is less than 10 mol % with respect to 1 mol of the entire structure unit of each alignment film material.
Organic group Y1 in formulae (P1) and (N1) is one of formula (Y1-a1) to formula (Y1-a2) and formula (Y1-b1) to formula (Y1-b81) described below.
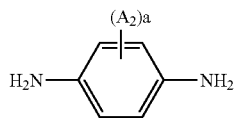
(Y1-a1)
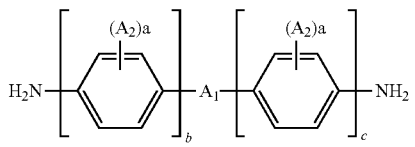
(Y1-a2)
(Y1-b1)
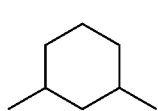
(Y1-b2)
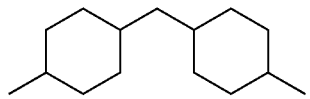
(Y1-b3)
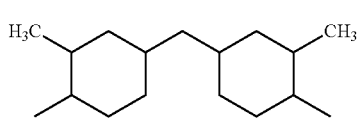
(Y1-b4)
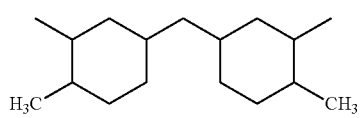
(Y1-b5)
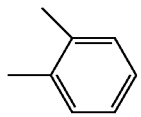
(Y1-b6)
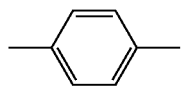
(Y1-b7)
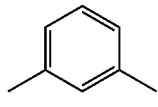
(Y1-b8)
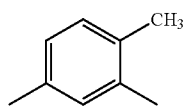
(Y1-b9)
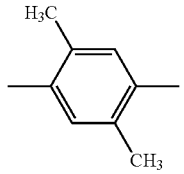
(Y1-b10)
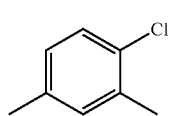
(Y1-b11)
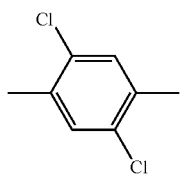
(Y1-b12)
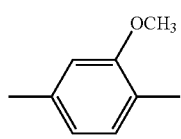
(Y1-b13)
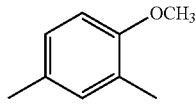
(Y1-b14)
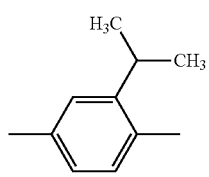
(Y1-b15)
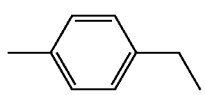
(Y1-b16)
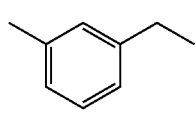
(Y1-b17)
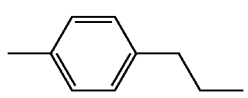
(Y1-b18)

-continued
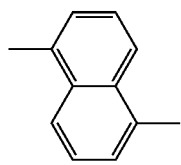
(Y1-b19)
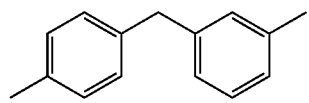
(Y1-b20)
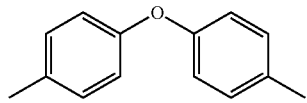
(Y1-b21)
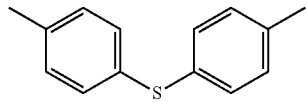
(Y1-b23)
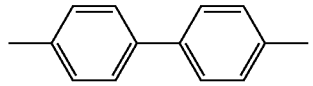
(Y1-b25)
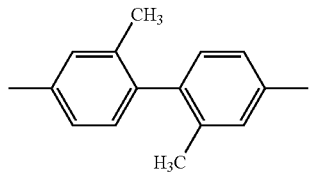
(Y1-b27)
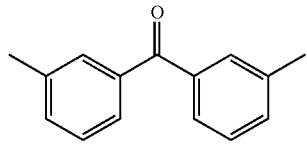
(Y1-b29)
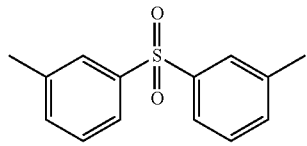
(Y1-b31)
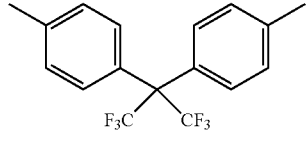
(Y1-b33)
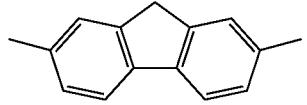
(Y1-b35)
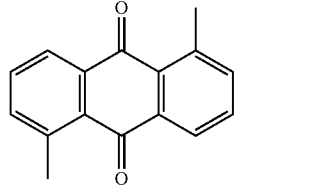
(Y1-b36)

-continued
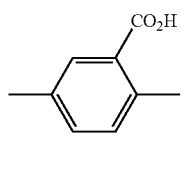
(Y1-b37)
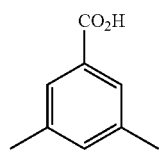
(Y1-b38)
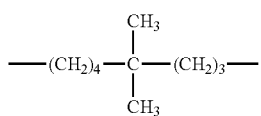
n = 2~5
(Y1-b39)
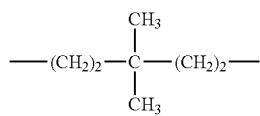
(Y1-b40)
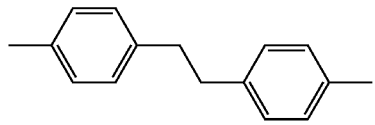
(Y1-b41)
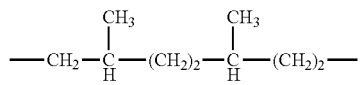
(Y1-b42)
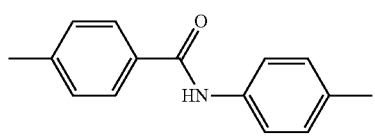
(Y1-b43)
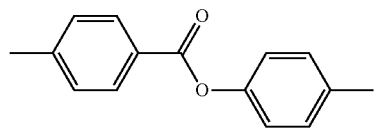
(Y1-b44)
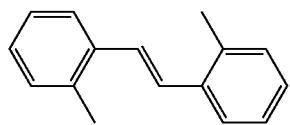
(Y1-b45)
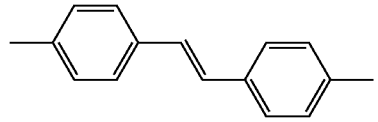
(Y1-b46)
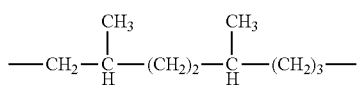
(Y1-b47)
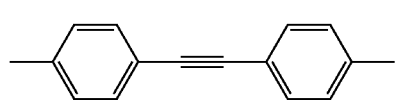
(Y1-b48)
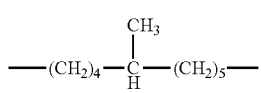
(Y1-b49)
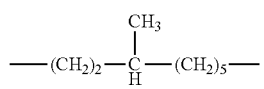
(Y1-b50)
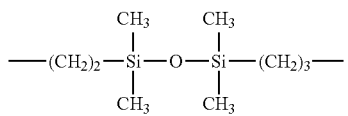
(Y1-b51)
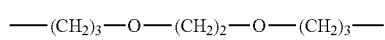
(Y1-b52)
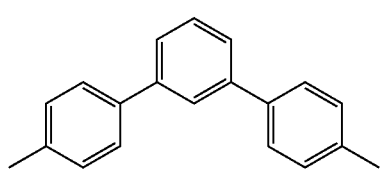
(Y1-b53)
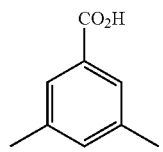
(Y1-b54)
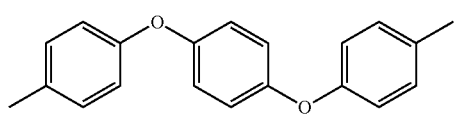
(Y1-b55)
(Y1-b56)
(Y1-b57)
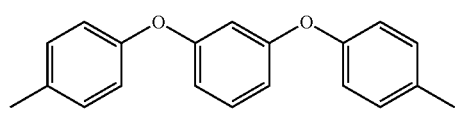
(Y1-b58)

-continued
(Y1-b59)
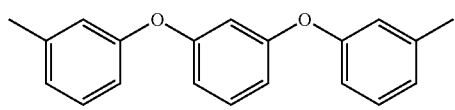
(Y1-b60)
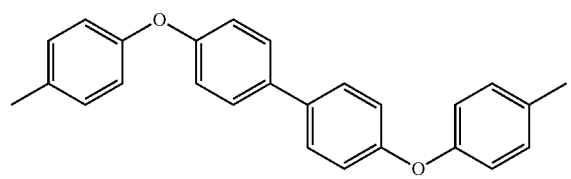
(Y1-b61)
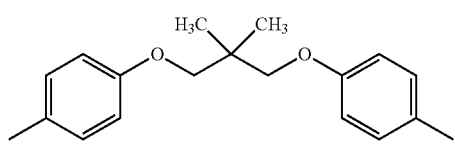
(Y1-b62)
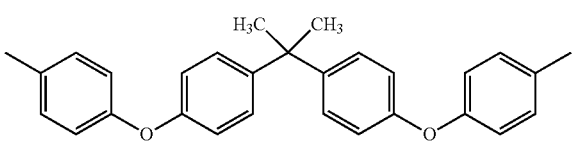
(Y1-b63)
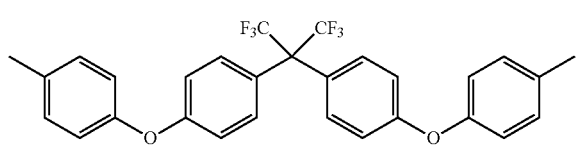
(Y1-b64)
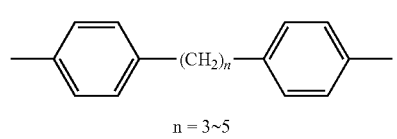
n = 3~5
(Y1-b65)
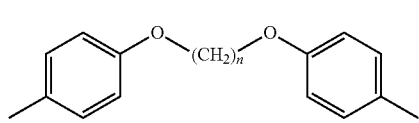
n = 4~5
(Y1-b66)
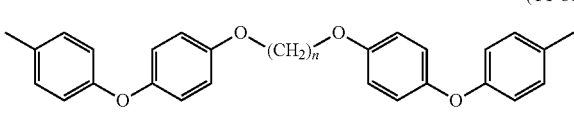
n = 2~5
(Y1-b67)
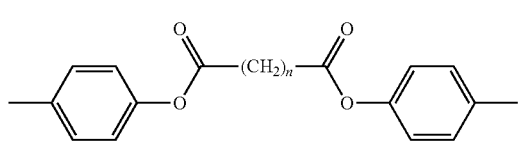
n = 2~5
(Y1-b68)
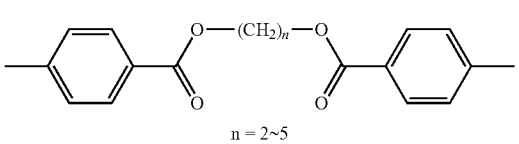
n = 2~5
(Y1-b69)
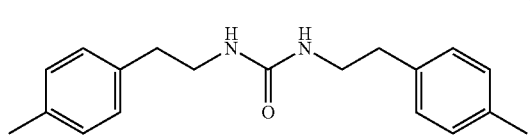
(Y1-b70)
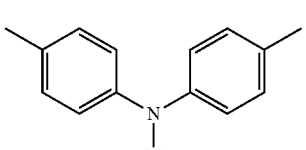
(Y1-b71)
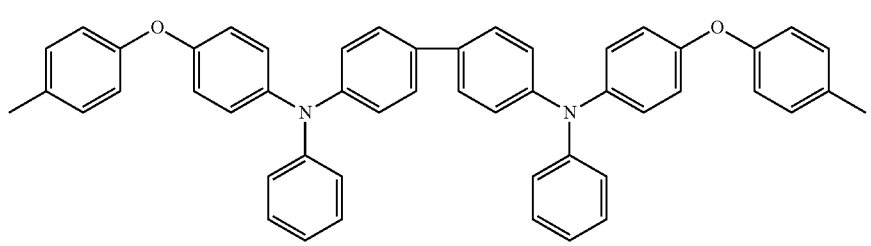
(Y1-b72)
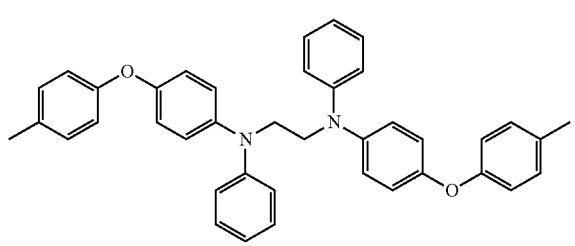
(Y1-b73)
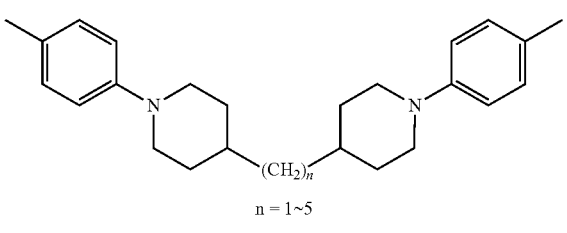
n = 1~5

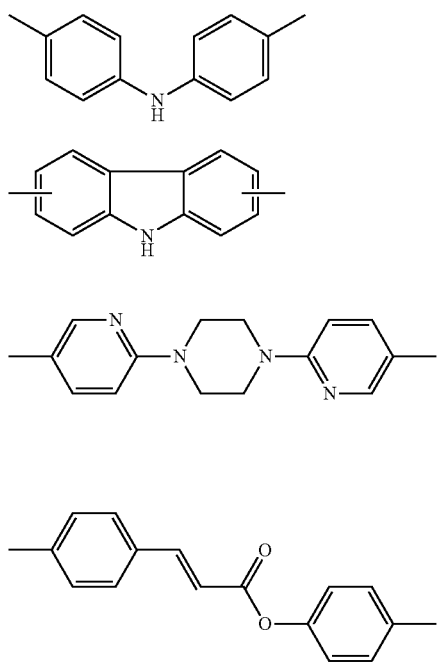
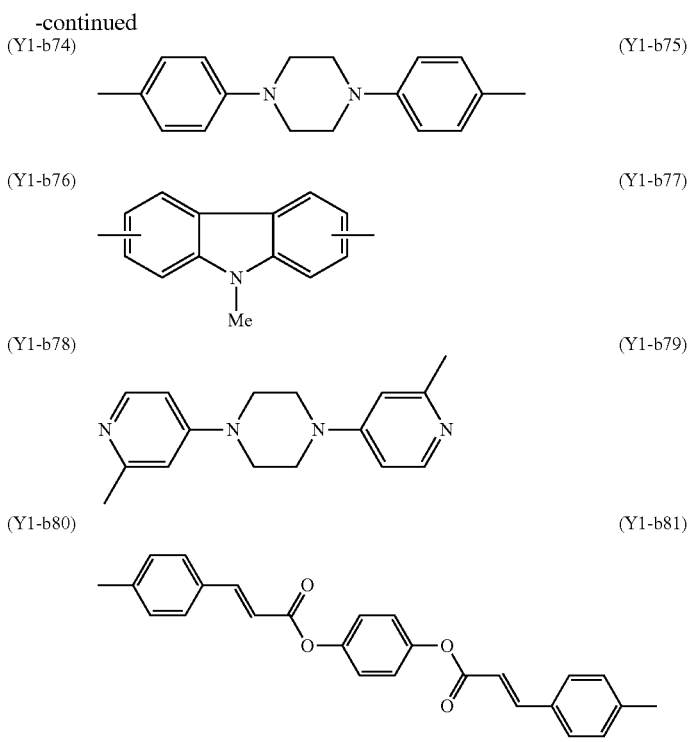

In formula (Y1-a2), A1 denotes a single bond, an ester bond, an amide bond, a thioester bond or a divalent organic group having 2 to 20 carbon atoms. In each of formula (Y1-a1) and formula (Y1-a2), A2 denotes a hydrogen atom, a halogen atom, a hydroxyl group, an amino group, a thiol group, a nitro group, a phosphate group or a monovalent organic group having 1 to 20 carbon atoms. In each of formula (Y1-a1) and formula (Y1-a2), a is an integer from 1 to 4. When a is greater than or equal to 2, the structure of A1 may be the same or differ. In formula (Y1-a2), each of b and c is independently an integer from 1 to 2.

As described above, each of the coloring components CM1 and CM2 contains an atom having an electronegativity of 3 or greater. For example, of formula (Y1-a1) and formula (Y1-a2), formulae which contain an atom having an electronegativity of 3 or greater are considered. Of formula (Y1-b1) to formula (Y1-b81), the formulae which contain an atom having an electronegativity of 3 or greater are formula (Y1-b11) to formula (Y1-b14), formula (Y1-b21) to formula (Y1-b22), formula (Y1-b29) to formula (Y1-b31), formula (Y1-b33) to formula (Y1-b34), formula (Y1-b36) to formula (Y1-b38), formula (Y1-b44) to formula (Y1-b45), formula (Y1-b52) to formula (Y1-b54), formula (Y1-b57) to formula (Y1-b63), and formula (Y1-b65) to formula (Y1-b81). For the coloring component CM1, formula (P1) containing the above formulae as organic group Y1 may be used. For the coloring component CM2, formula (N1) containing the above formulae as organic group Y1 may be used.

To the contrary, organic group Y1 contained in each of the transparent components TM1 and TM2 may be, of formula (Y1-a1) to formula (Y1-a2) and formula (Y1-b1) to formula (Y1-b81), an organic group which does not contain an atom having an electronegativity of 3 or greater. Specifically, organic group Y1 should be one of, of formula (Y1-a1) and formula (Y1-a2), an organic group which does not contain an atom having an electronegativity of 3 or greater, formula (Y1-b1) to formula (Y1-b10), formula (Y1-b15) to formula (Y1-b20), formula (Y1-b23) to formula (Y1-b28), formula (Y1-b32), formula (Y1-b35), formula (Y1-b39) to formula (Y1-b43), formula (Y1-b46) to formula (Y1-b51), formula (Y1-b55) to formula (Y1-b56), and formula (Y1-b64). For the transparent component TM1, formula (P1) containing the above formulae as organic group Y1 may be used. For the transparent component TM2, formula (N1) containing the above formulae as organic group Y1 may be used.

The thickness of each of the first and second alignment films AL1 and AL2 formed of the above alignment film materials should be greater than or equal to 20 nm but less than or equal to 200 nm, desirably greater than or equal to 40 nm but less than or equal to 120 nm, more desirably greater than or equal to 20 nm but less than or equal to 60 nm.

In the first and second alignment films AL1 and AL2 of the present embodiment, the contained amount of each of the coloring components CM1 and CM2 is less as it is less than 10 mol % with respect to 1 mol of the entire structure unit of the alignment film material. However, in the display device DSP (display panel PNL) using polymer dispersed liquid crystals, the alignment restriction force is sufficient even with the above thicknesses.

By using the alignment film materials comprising the structure of the present embodiment, the amount of the introduction of the coloring components CM1 and CM2 can be reduced. The absorption of the light guided inside the display panel PNL can be suppressed by reducing the amount of the introduction of the coloring components which are light-absorptive components. Further, in the present embodiment, the first alignment film AL1 and the second alignment film AL2 can be made thin. Because of the above factors, the transmittance of the display device DSP can be improved. Moreover, the luminance gradient and chromaticity deviation of the display device DSP can be reduced. Thus, the display can be more uniform.

Modified Example of Alignment Film Materials

The alignment film material of the first alignment film AL1 or the second alignment film AL2 is not limited to the example described above. In the modified example explained below, the mole ratio between the photolysis component PD and the non-decomposition component ND is different from that of the third embodiment.

In this modified example, the contained amount of the photolysis component PD is greater than or equal to 50 mol % but less than or equal to 100 mol %. The contained amount of the non-decomposition component ND is greater than or equal to mol % but less than or equal to 50 mol %. The photolysis component PD comprises the transparent component TM1 and the coloring component CM1 in a manner similar to that of the third embodiment. The non-decomposition component ND also comprises the transparent component TM2 and the coloring component CM2 in a manner similar to that of the third embodiment. Each of the components is similar to that of the third embodiment. Thus, description thereof is omitted.

In this modified example, similarly, the contained amount of each of the coloring components CM1 and CM2 is less than 10 mol % with respect to 1 mol of the entire structure unit of the alignment film material. The absorption of the light emitted from the light sources LS by the first alignment film AL1 and the second alignment film AL2 can be reduced by decreasing the contained amount of each of the coloring components CM1 and CM2 which are light-absorptive components.

In the first and second alignment films AL1 and AL2 of this modified example, the ratio of the photolysis component PD which is an alignment component is greater than that of the third embodiment. Thus, a greater alignment restriction force can be obtained. In this modified example, similarly, the transmittance of the display device DSP can be improved, and the luminance gradient and the chromaticity deviation can be reduced.

In this modified example, the thickness of each of the first alignment film AL1 and the second alignment film AL2 should be desirably greater than or equal to 10 nm but less than or equal to 60 nm. The thickness should be more desirably greater than or equal to 20 nm but less than or equal to 50 nm. In general, an alignment film having such a thickness is too thin to be used in a liquid crystal display device comprising a liquid crystal layer different from a polymer dispersed liquid crystal. However, in the display device DSP, as described above, the alignment restriction force of each alignment film is mainly needed at the time of the polymerization of polymerizable monomers. For this reason, the alignment films of this modified example satisfactorily fulfill their roles even if they are thin as described above.

The third embodiment and its modified example assume a case where the first alignment film AL1 and the second alignment film AL2 are formed of similar alignment film materials, and an alignment restriction force is imparted to both alignment films by a photo-alignment treatment. However, only one of the first alignment film AL1 and the second alignment film AL2 may be formed of the alignment film material disclosed in the third embodiment or its modified example.

All of the display devices and manufacturing methods thereof that can be implemented by a person of ordinary skill in the art through arbitrary design changes to the display device and manufacturing method thereof described above as the embodiments of the present invention come within the scope of the present invention as long as they are in keeping with the spirit of the present invention.

Various modification examples which may be conceived by a person of ordinary skill in the art in the scope of the idea of the present invention will also fall within the scope of the invention. For example, even if a person of ordinary skill in the art arbitrarily modifies the above embodiments by adding or deleting a structural element or changing the design of a structural element, or by adding or omitting a step or changing the condition of a step, all of the modifications fall within the scope of the present invention as long as they are in keeping with the spirit of the invention.

Further, other effects which may be obtained from each embodiment and are self-explanatory from the descriptions of the specification or can be arbitrarily conceived by a person of ordinary skill in the art are considered as the effects of the present invention as a matter of course.

What is claimed is:

1. A manufacturing method of a display device comprising:
   a first substrate including:
      a plurality of pixel electrodes provided in a plurality of pixels constituting a display area;
      an insulating layer formed in a grating shape defining openings in each of the pixels; and
      a first alignment film above the pixel electrodes and the insulating layer;
   a second substrate including a common electrode and a second alignment film facing the first alignment film; and
   a liquid crystal layer provided between the first alignment film and the second alignment film and containing a streaky polymer and a plurality of liquid crystal molecules, wherein
   the first alignment film comprises:
      a protrusion generated by the insulating layer; and
      a plurality of flat areas formed in the pixels, surrounded by the protrusion and overlapping the openings, respectively, and parallel to a horizontal plane of the first substrate, and
   a first director of each of the liquid crystal molecules located near the flat areas is parallel to the horizontal plane in a state where no potential difference is formed between the pixel electrodes and the common electrodes,
   the method comprising:
   preparing the first substrate including the pixel electrodes and the insulating layer including the openings;
   preparing the second substrate including the common electrode;
   applying a first alignment film material to a surface of the first substrate;
   applying a second alignment film material to a surface of the second substrate;
   forming the first alignment film by applying a photo-alignment treatment to the first alignment film material for making a pretilt angle of each of the liquid crystal molecules located near the flat areas zero;
   forming the second alignment film by applying a rubbing alignment treatment to the second alignment film material for making a pretilt angle of each of the liquid crystal molecules located near the second alignment film larger than zero;

introducing a liquid crystal material containing a liquid crystal molecule and a polymerizable monomer between the first alignment film and the second alignment film; and forming the liquid crystal layer containing the polymer and the liquid crystal molecules by polymerizing the polymerizable monomer by emitting ultraviolet light to the liquid crystal material, wherein a thickness of the first alignment film is greater than or equal to 20 nm and less than or equal to 60 nm, a transmittance of the first alignment film for light having a wavelength of 450 nm is greater than or equal to 98%, the first alignment film material contains a photolysis component and a non-decomposition component, the photolysis component contains a first transparent component and a first coloring component, the non-decomposition component contains a second transparent component and a second coloring component, the first transparent component contains a polyamide acid or polyamide acid ester comprising a structure unit shown in formula (P1),

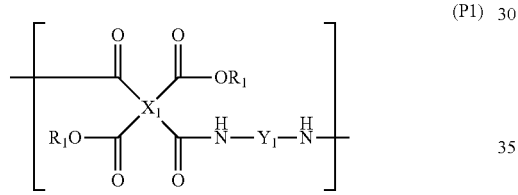
(P1)

the x1 of the formula (P1) is one of formula (X1-1) to formula (x1-4),

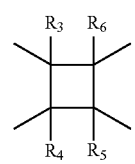
(X1-1)

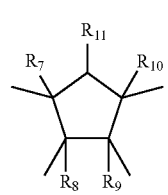
(X1-2)

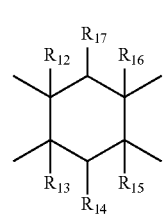
(X1-3)

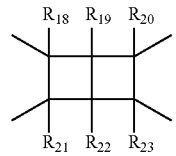
(X1-4)

the R1 of the formula (P1) is a hydrogen atom or an alkyl group having 1 to 4 carbon atoms, and each of the R3 to the R23 of the formula (X1-1) to the formula (X1-4) is independently a hydrogen atom, a halogen atom, an alkyl group having 1 to 6 carbon atoms, an alkenyl group having 2 to 6 carbon atoms, an alkynyl group having 2 to 6 carbon atoms, a monovalent organic group containing a fluorine atom and having 1 to 6 carbon atoms or a phenyl group, a contained amount of the photolysis component is greater than or equal to 20 mol % but less than 50 mol % with respect to 1 mol of an entire structure unit of the first alignment film material, the first coloring component contains a polyamide acid or polyamide acid ester comprising the structure unit shown in the formula (P1), the Y1 of the formula (P1) of the first coloring component contains a polyamide acid or polyamide acid ester containing nitrogen, oxygen, fluorine or chlorine, a contained amount of the first coloring component is less than 10 mol % with respect to 1 mol of the entire structure unit of the first alignment film material, the non-decomposition component contains a polyamide acid or polyamide acid ester comprising a structure unit shown in formula (N1),

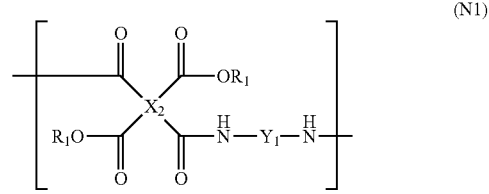
(N1)

the X2 of the formula (N1) is one of formula (X2-1) to formula (X2-22),

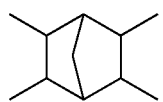
(X2-1)

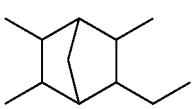
(X2-2)

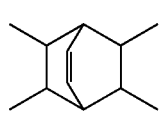
(X2-3)

(X2-4)

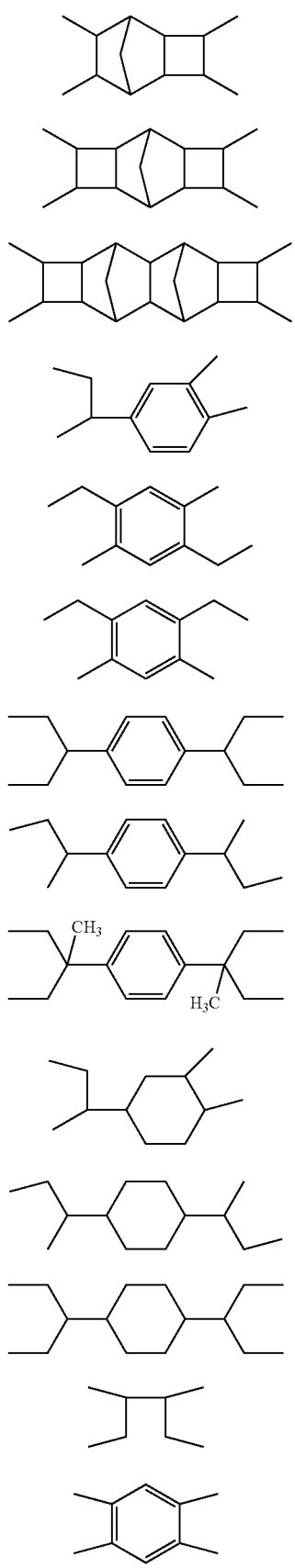

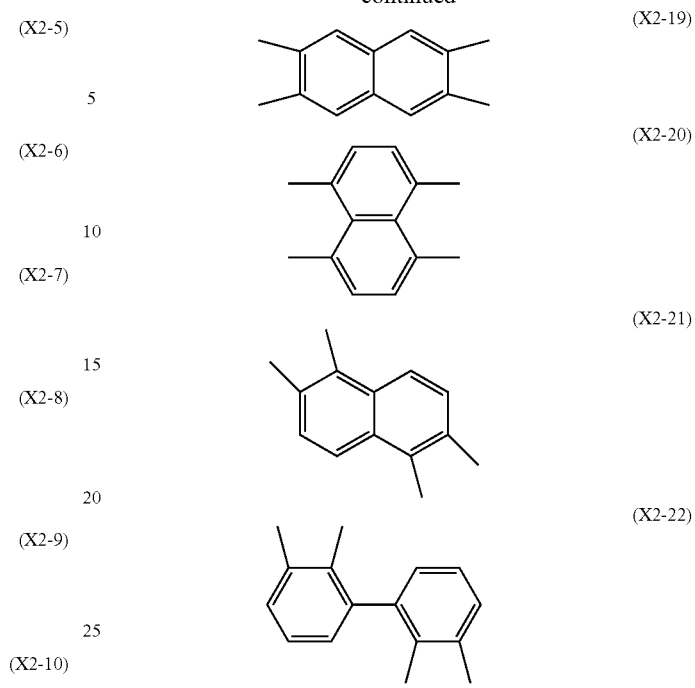

a contained amount of the non-decomposition component is greater than 50 mol % but less than 80 mol % with respect to 1 mol of the entire structure unit of the first alignment film material, the second coloring component contains a polyamide acid or polyamide acid ester comprising the structure unit shown in the formula (N1), the Y1 of the formula (N1) of the second coloring component contains nitrogen (N), oxygen (O), fluorine (F) or chlorine (Cl), a contained amount of the second coloring component is less than or equal to 10 mol % of the entire first alignment film material, each of the Y1 of the formula (P1) and the Y1 of the formula (N1) is one of formula (Y1-a1) to formula (Y1-a2) and formula (Y1-b1) to formula (Y1-b81),

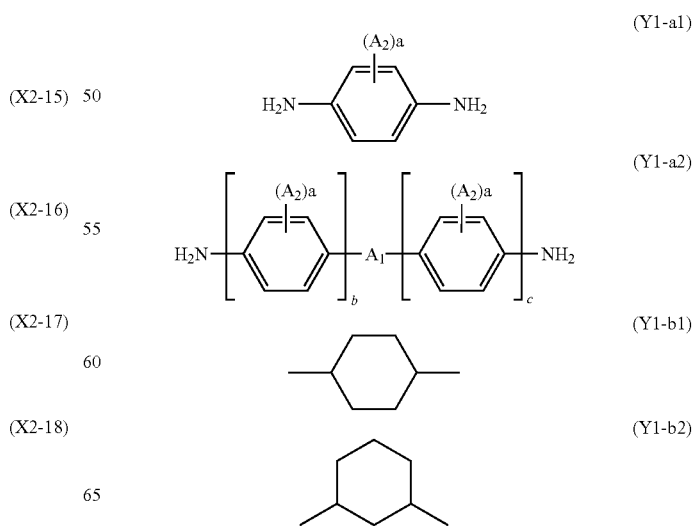

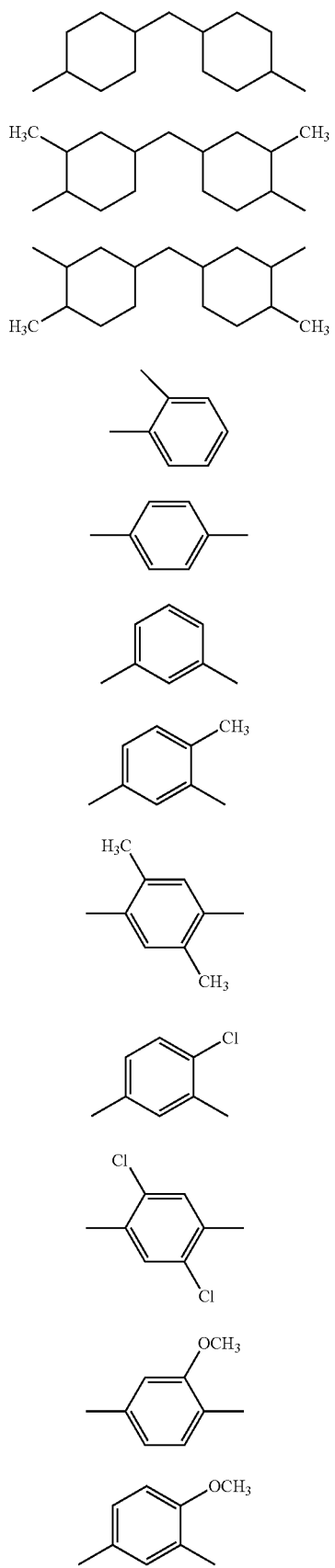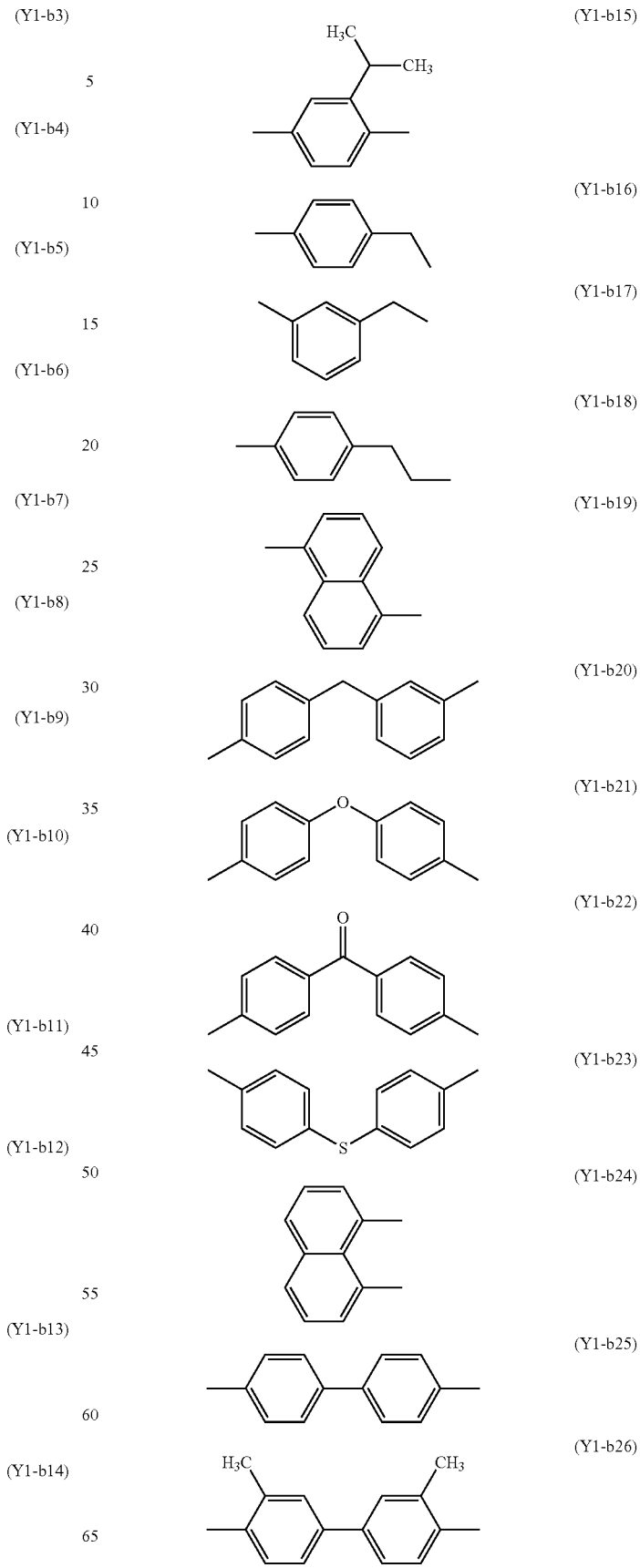

| | |
|---|---|
| (Y1-b27) | |
| (Y1-b28) | |
| (Y1-b29) | |
| (Y1-b30) | |
| (Y1-b31) | |
| (Y1-b32) | |
| (Y1-b33) | |
| (Y1-b34) | |
| (Y1-b35) | |
| (Y1-b36) | |

(Y1-b37)

(Y1-b38)

(Y1-b39)

—(CH$_2$)$_n$—
n = 2~5

(Y1-b40)

(Y1-b41)

(Y1-b42)

(Y1-b43)

(Y1-b44)

(Y1-b45)

(Y1-b46)

(Y1-b47)

(Y1-b48)

(Y1-b49)

(Y1-b50) 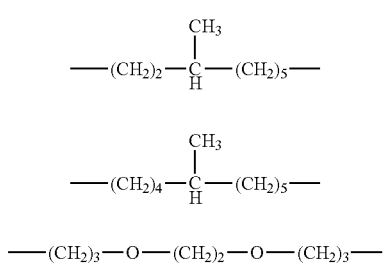
(Y1-b51)
(Y1-b52) 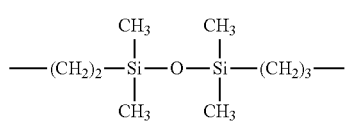
(Y1-b53)
(Y1-b54) 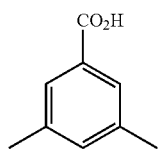
(Y1-b55) 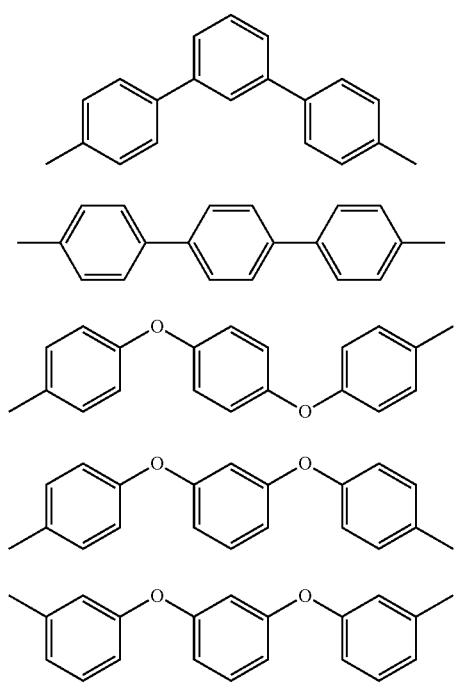
(Y1-b56)
(Y1-b57)
(Y1-b58)
(Y1-b59)
(Y1-b60)
(Y1-b61) 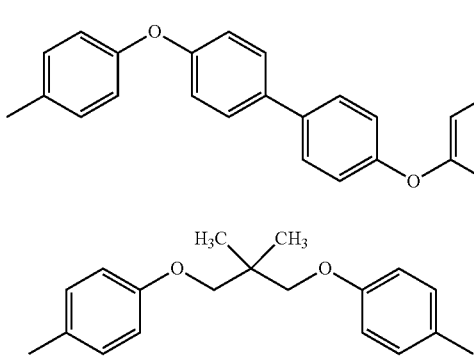
(Y1-b62) 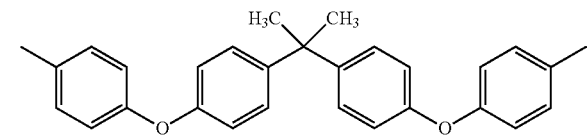
(Y1-b64) 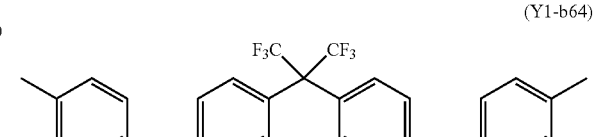
n = 3~5
(Y1-b65) 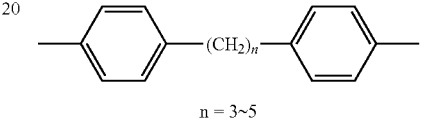
n = 4~5
(Y1-b66) 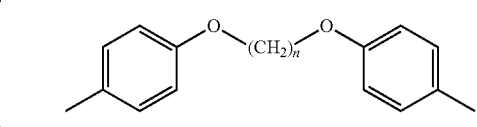
n = 2~5
(Y1-b67) 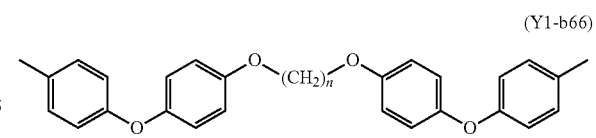
n = 2~5
(Y1-b68) 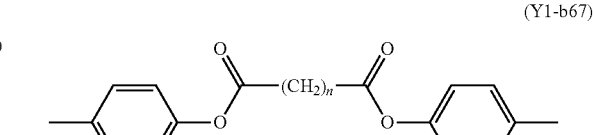
n = 2~5
(Y1-b69) 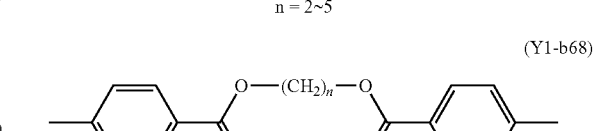
(Y1-b70) 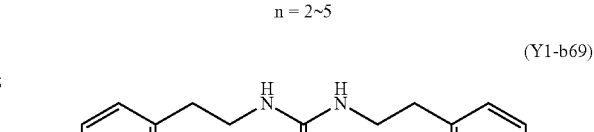

-continued (Y1-b71) 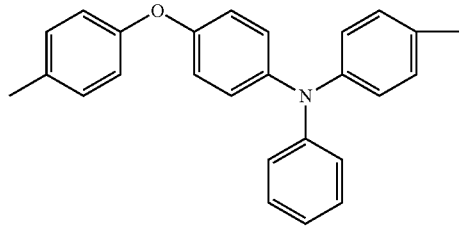

(Y1-b72) 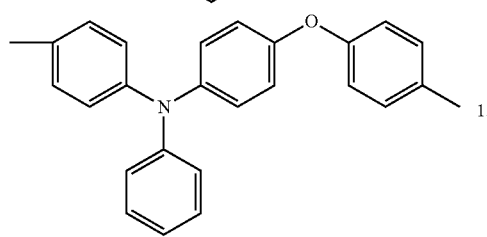

(Y1-b73) 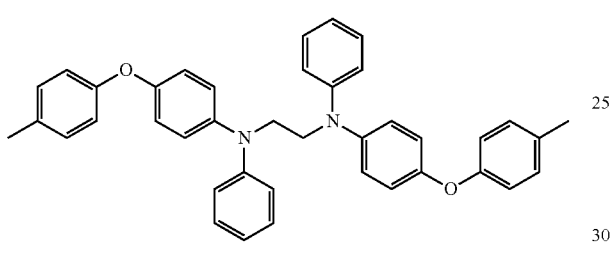

n = 1~5

(Y1-b74) 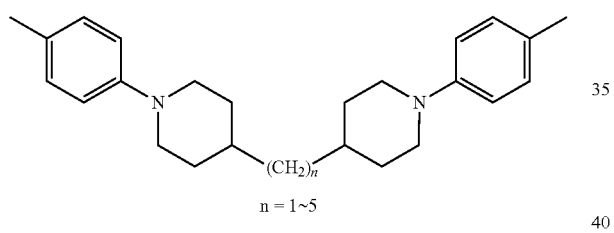

(Y1-b75) 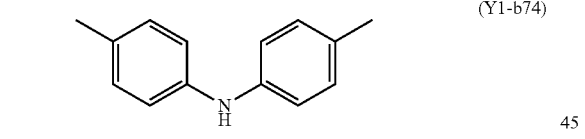

(Y1-b76) 

(Y1-b77) 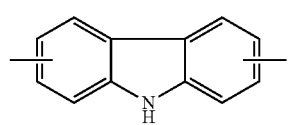

(Y1-b78) 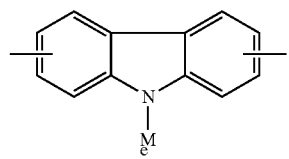

-continued (Y1-b79) 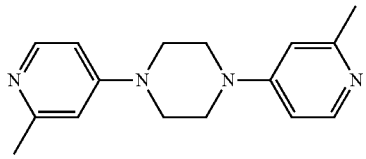

(Y1-b80) 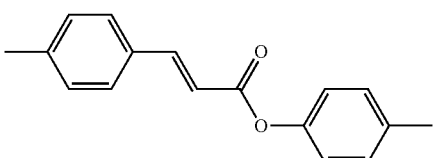

(Y1-b81) 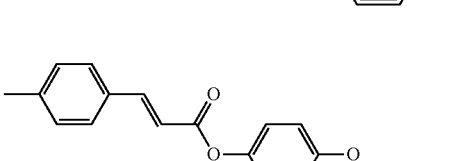

the A1 of the formula (Y1-a2) is a single bond, an ester bond, an amide bond, a thioester bond or a divalent organic group having 2 to 20 carbon atoms, and the A2 of each of the formula (Y1-a1) and the formula (Y1-a2) is a hydrogen atom, a halogen atom, a hydroxyl group, an amino group, a thiol group, a nitro group, a phosphate group or a monovalent organic group having 1 to 20 carbon atoms, and the a of each of the formula (Y1-a1) and the formula (Y1-a2) is an integer from 1 to 4, and each of the b and the c of the formula (Y1-a2) is independently an integer from 1 to 2.

2. The manufacturing method of claim 1, wherein the X1 is one of formula (X1-11) to formula (X1-17)

(X1-11) 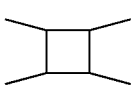

(X1-12) 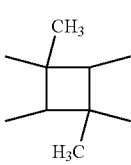

(X1-13) 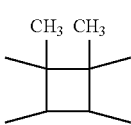

(X1-14) 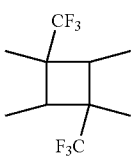

(X1-15)
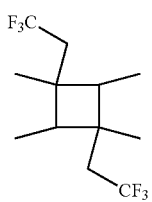

(X1-16)
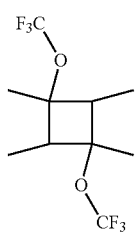

(X1-17)
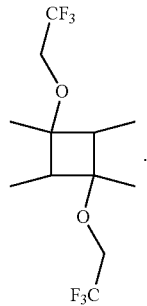

3. The manufacturing method of claim 1, wherein each of the formula (Y1-a1) and the formula (Y1-a2) contains an atom having an electronegativity of 3 or greater in a portion other than an amine of a diamine.

4. The manufacturing method of claim 1, wherein
the Y1 is one of the formula (Y1-b11) to the formula (Y1-b14), the formula (Y1-b21) to the formula (Y1-b22), the formula (Y1-b29) to the formula (Y1-b31), the formula (Y1-b33) to the formula (Y1-b34), the formula (Y1-b36) to the formula (Y1-b38), the formula (Y1-b44) to the formula (Y1-b45), the formula (Y1-b52) to the formula (Y1-b54), the formula (Y1-b57) to the formula (Y1-b63), and the formula (Y1-b65) to the formula (Y1-b81).

\* \* \* \* \*